(12) United States Patent
Trenholm et al.

(10) Patent No.: US 10,546,373 B2
(45) Date of Patent: Jan. 28, 2020

(54) SYSTEM AND METHOD FOR INTEGRATED LASER SCANNING AND SIGNAL PROCESSING

(71) Applicant: SIGHTLINE INNOVATION INC., Toronto (CA)

(72) Inventors: Wallace Trenholm, Toronto (CA); Maithili Mavinkurve, Markham (CA); Jason Cassidy, Winnipeg (CA)

(73) Assignee: Sightline Innovation Inc., Toronto (CA)

( * ) Notice: Subject to any disclaimer, the term of this patent is extended or adjusted under 35 U.S.C. 154(b) by 169 days.

(21) Appl. No.: 15/668,242

(22) Filed: Aug. 3, 2017

(65) Prior Publication Data

US 2018/0040119 A1 Feb. 8, 2018

Related U.S. Application Data

(60) Provisional application No. 62/370,365, filed on Aug. 3, 2016.

(51) Int. Cl.
| | | |
|---|---|---|
| *G06T 7/00* | (2017.01) |
| *G01B 11/30* | (2006.01) |
| *G06T 7/41* | (2017.01) |
| *G06T 5/00* | (2006.01) |
| *G06K 9/66* | (2006.01) |
| *H04N 5/225* | (2006.01) |
| *G06T 7/70* | (2017.01) |
| *G06N 3/04* | (2006.01) |
| *G06N 3/08* | (2006.01) |
| *G01N 21/00* | (2006.01) |

(52) U.S. Cl.
CPC .......... *G06T 7/0008* (2013.01); *G01B 11/303* (2013.01); *G06K 9/66* (2013.01); *G06N 3/04* (2013.01); *G06N 3/088* (2013.01); *G06T 5/002* (2013.01); *G06T 7/41* (2017.01); *G06T 7/70* (2017.01); *H04N 5/2256* (2013.01); *G06T 2207/10028* (2013.01)

(58) Field of Classification Search
CPC ............... G06T 7/00; G06K 9/00; H04N 5/00
USPC ......................................................... 382/108
See application file for complete search history.

(56) References Cited

U.S. PATENT DOCUMENTS

| | | |
|---|---|---|
| 5,815,251 A | 9/1998 | Ehbets et al. |
| 7,212,670 B1 * | 5/2007 | Rousselle ............ G06K 9/0063 382/173 |

(Continued)

OTHER PUBLICATIONS

Pengcheng Hu et al., Phase-shift laser range finder based on high speed and high precision phase-measuring techniques, 10th International Symposium on Measurement Technology and Intelligent Instruments (ISMTII 2011), Jun. 29-Jul. 2, 2011.

(Continued)

*Primary Examiner* — Abolfazl Tabatabai
(74) *Attorney, Agent, or Firm* — Anile Bhole; Marc Lampert; Bhole IP Law

(57) ABSTRACT

There is provided systems and methods for laser scanning of one or more surfaces; in a particular embodiment, laser scanning of concrete. The system includes: at least one laser scanning module for acquiring imaging data comprising one or more distance measurements between the laser scanning module and each of the surfaces, according to a laser scanning modality; and a computing module, including one or more processors, in communication with the laser scanning module, for: aggregating the imaging data; processing and denoising the imaging data; and determining the presence or absence of a condition on each of the surfaces based on the imaging data.

18 Claims, 11 Drawing Sheets

(56) References Cited

U.S. PATENT DOCUMENTS

| | | | |
|---|---|---|---|
| 7,215,430 | B2 | 5/2007 | Kacyra et al. |
| 7,869,005 | B2 | 1/2011 | Ossig et al. |
| 8,064,046 | B2 | 11/2011 | Ossig et al. |
| 8,625,106 | B2 | 1/2014 | Ossig et al. |
| 8,830,485 | B2 | 9/2014 | Woloschyn |
| 8,848,203 | B2 | 9/2014 | Bridges et al. |
| 9,113,023 | B2 | 8/2015 | Bridges et al. |
| 9,633,433 | B1* | 4/2017 | Thomson ............. G06K 9/6201 |
| 2002/0154287 | A1 | 10/2002 | Bowers |
| 2006/0119833 | A1 | 6/2006 | Hinderling et al. |
| 2008/0239281 | A1 | 10/2008 | Bridges |
| 2009/0185746 | A1* | 7/2009 | Mian .................. G06K 9/00201 382/209 |
| 2014/0063489 | A1 | 3/2014 | Steffey et al. |
| 2015/0168551 | A1 | 6/2015 | Stutz |

OTHER PUBLICATIONS

Chen Wang, FPGA-based 4-channel high speed phasemeter for heterodyne interferometry, Graduate Thesis Department of Electrical and Computer Engineering, University of Rochester, 2013.

Daria Permaneva, Optical heterodyne detection of phase-shifted signals, Thesis prepared for the Degree of Master of Science in Telecommunications Engineering Technology, Rochester Institute of Technology, Apr. 2, 2014.

Fadi A. Bayoud, Leica's pinpoint EDM Technology with modified signal processing and novel optomechanical features, Shaping the Change; XXIII FIG Congress, Munich, Germany, Oct. 8-13, 2006.

Hannes Maar and Hans-Martin Zogg, WFD—Waveform Digitizer Technology White Paper, Heerbrug Switzerland, Sep. 2014.

Faro Technologies Inc., Technology White Paper: Phase shift measurement and time of flight measurement, Jan. 18, 2011.

Thibaut Weise et al., Fast 3D Scanning with Automatic Motion Control, Computer Vision and Pattern Recognition, 2007, Jun. 17-22, 2007.

Norbert Pfeifer and Christian Briese, Laser Scanning Principles and Applications, Conference Paper: GeoSiberia 2007—International Exhibition and Scientific Congress, Apr. 2007.

Ming Lei et al., Research on detection performance in laser ranging system, 2011 International Conference on Computer Science and Information Technology, IPCSIT vol. 51 (2012).

Liang-Chia Chen et al., A 3-D point clouds scanning and registration methodology for automatic object digitization, Smart Science, 4:1, 1-7, Apr. 20, 2016.

* cited by examiner

SYSTEM AND METHOD FOR INTEGRATED LASER SCANNING AND SIGNAL PROCESSING

TECHNICAL FIELD

The present disclosure relates to laser scanning. More particularly, the present disclosure relates to a system and method for integrated laser scanning and signal processing for inspecting a material or space.

BACKGROUND

Automated systems and methods using laser scanning imaging techniques are rapidly gaining acceptance as a tool for three dimensional modeling and analysis. This is especially true in settings such as construction, where quality control is critical and the collection of accurate field data is essential. In contrast to manual data acquisition techniques that may require human interpretation in order to derive a representation of the scanned target, automatic laser scanning operations facilitate a dense sampling of the object surface within a short period of time. Laser scanners may be used for scanning closed or open spaces such as the interior spaces of buildings or structures, industrial installations, construction sites etc.

Laser scanning operations typically scan a target, which may be an object, scene, space, material, etc., with a laser to measure distances to the target in order to generate three dimensional imaging data. This can include measurement of distances into the hundreds of meters with millimeter precision. The target may be a reflective or a diffuse surface. By acquiring a number of distances, a target's surface can be mapped. In some instances, this mapping can be further evaluated for the presence or absence of a particular condition, such as irregularities or desired dimensions, and possibly remedial efforts undertaken.

Additionally, improvements in software tools for processing and analyzing three dimensional point data sets—point clouds—have enabled the handling of very large point clouds generated by laser scanning operations and integration of point cloud data into modelling software.

In some applications, such as construction, a project team may need to quickly and accurately identify the locations and available resources and determine quality specifications. Defects in construction may occur during the construction process, which may require costly rework and adversely affect the overall performance of the built environment. Current construction and industrial practices still face challenges regarding access to accurate information in a timely manner. Further, defects caused by manual processes and human intervention can be expensive to correct and time consuming. Inspection programs employed today in construction and other materials inspection environments cannot adequately detect and manage defects that may exist in the scanned materials. Such limitations can be minimized and overcome by the proactive application of advanced laser scanning operations and signal processing techniques.

Accordingly, a system and method is desired that provides integrated laser scanning and signal processing capabilities for quality control and related imaging operations, including by increasing automation and limiting requirements for human intervention.

SUMMARY

It is an object of the present disclosure to provide a novel system and method for integrated laser scanning and signal processing which obviates or mitigates at least one disadvantage of the prior art.

In an aspect, there is provided a laser scanning inspection system for scanning one or more surfaces, the system comprising: at least one laser scanning module for acquiring imaging data comprising one or more distance measurements between the laser scanning module and each of the surfaces, according to a laser scanning modality; and a computing module, comprising one or more processors, in communication with the laser scanning module, for: aggregating the imaging data; processing and denoising the imaging data; and determining the presence or absence of a condition on each of the surfaces based on the imaging data.

In a particular case, the laser scanning modality is a phase shift measurement modality.

In another case, the laser scanning module comprises: a light source for emitting a laser beam; a target photodetector for generating imaging data from the laser beam; a beam steering device to direct the laser beam at a series of points on a respective one of the surfaces and to direct the laser beam reflected off the respective surface to the photodetector; and a distance module for determining the distance measurements associated with the imaging data corresponding to phase shift measurements for the series of points.

In yet another case, the laser scanning module further comprises a reference photodetector and a beam splitter, the beam splitter directing a first portion of the laser beam towards the respective surface and directs a second portion of the laser beam towards the reference photodetector, the second portion used by the distance module as a reference for the phase shift measurement.

In yet another case, the light source modulates the emitted laser beam, and wherein the distance module applies heterodyne demodulation to determine the phase shift.

In yet another case, the laser scanning module acquires reference imaging data associated with a reference surface, and the computing module uses the reference imaging data as a reference for determining relative positioning of the one or more surfaces.

In yet another case, the imaging data comprises a three dimensional point cloud in a coordinate system, and wherein the aggregating and processing of the imaging data generates a three-dimensional model of the surface.

In yet another case, the at least one laser scanning module comprises a plurality of laser scanning modules spaced from each other, and wherein the computing module aggregates the imaging data from the plurality of laser scanning modules.

In yet another case, the computing module employs a neural network for receiving the imaging data at an input layer and generating the determination of the presence or absence of the condition on each of the surfaces at an output layer.

In yet another case, the neural network employed by the computing module comprises at least one of supervised learning, unsupervised learning, semi-supervised learning, groundtruther learning, reinforcement learning, or anomaly detection.

In yet another case, the neural network employed by the computing module comprises a trained model that is trained on a computing device that is remote from the computing module.

In another aspect, there is provided a method for laser scanning inspection of one or more surfaces, the method comprising: acquiring imaging data comprising one or more distance measurements according to a laser scanning modality; aggregating the imaging data; processing and denoising the imaging data; and determining the presence or absence of a condition on each of the surfaces based on the imaging data.

In a particular case, the laser scanning modality is a phase shift measurement modality.

In another case, the method further comprising: emitting a laser beam; directing the laser beam at a series of points on a respective one of the surfaces; directing the laser beam reflected off the respective surface to a photodetector; generating imaging data from the reflected laser beam; and determining the distance measurements associated with the imaging data corresponding to phase shift measurements for the series of points.

In yet another case, the method further comprising: directing a first portion of the laser beam towards the respective surface; and directing a second portion of the laser beam towards a reference photodetector, wherein the second portion is used as a reference for the phase shift measurement.

In yet another case, the method further comprising: modulating the emitted laser beam prior to emission; and applying heterodyne demodulation to determine the phase shift.

In yet another case, determining the presence or absence of a condition on each of the surfaces based on the imaging data uses a neural network, the imaging data received at an input layer of the neural network and the determination of the presence or absence of the condition on each of the surfaces is generated at an output layer.

In yet another case, the method further comprising: sending the imaging data to a remote computing device, the sent imaging data used by the remote computing device as training data to train a machine learning model; receiving the trained machine learning model from the remote computing device; and performing the determining of the presence or absence of a condition on each of the surfaces using the trained machine learning model.

In yet another case, the method further comprising: sending the imaging data to a remote computing device, the remote computing device applying the imaging data to a trained machine learning model to determine the presence or absence of a condition on each of the surfaces; and receiving the determination of the presence or absence of a condition on each of the surfaces from the remote computing device.

In another aspect, there is provided a method for inspection of concrete using laser scanning, the method comprising: positioning one or more targets on the concrete; acquiring imaging data from a plurality of laser scanning modules, the imaging data comprising a distance measurement from the respective laser scanning module to each of the targets, according to a laser scanning modality; registering the imaging data by stitching the imaging data from each of the laser scanning modules together for each of the targets; processing and denoising the registered imaging data; and determining a property of the concrete at each of the targets based on the respective registered imaging data.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

Preferred embodiments of the present disclosure will now be described, by way of example only, with reference to the attached Figures, wherein.

DETAILED DESCRIPTION

Figure 1:
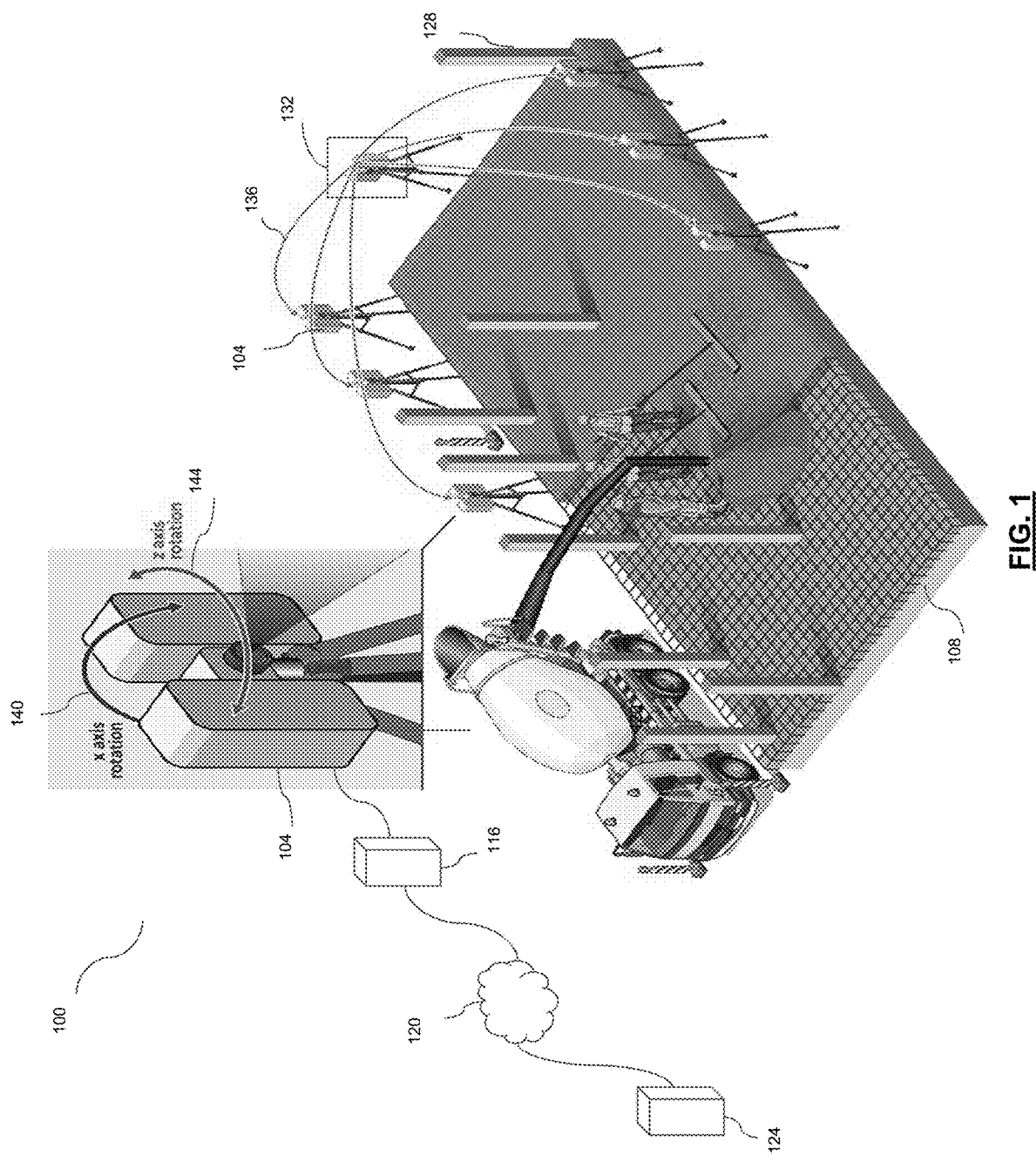
FIG. 1 shows a system for scanning a target via a laser scanning modality, in accordance with an embodiment.

Before the subject matter of the present disclosure is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments herein. Also, the description is not to be considered as limiting the scope of the embodiments described herein.

Various terms used throughout the present disclosure may be read and understood as follows, unless the context indicates otherwise: "or" as used throughout is inclusive, as though written and/or; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" and "exemplifying" and not necessarily as "preferred" over other embodiments. Further definitions for terms may be set out herein; these may apply to prior and subsequent instances of those terms, as will be understood from a reading of the present disclosure/description.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, a limited number of the exemplary methods and materials are described herein.

It must be noted that as used herein and in the appended claims, the singular forms "a", "an", and "the" include plural referents unless the context clearly dictates otherwise.

Any module, unit, component, server, computer, terminal, engine, or device exemplified herein that executes instructions may include or otherwise have access to computer readable media such as storage media, computer storage media, or data storage devices (removable and non-removable) such as, for example, magnetic discs, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Referring now to FIG. 1, shown therein is a system 100 for scanning a target via laser scanning modality, the target comprising a material under inspection, in accordance with an embodiment. Suitable laser scanning modalities may include, for example, phase shift measurement, time-of-flight, or the like. A given target may include cooperative (i.e. reflective) or non-cooperative (i.e. diffuse) surfaces or materials for which a user desires to obtain imaging data, such as for evaluation purposes, and may comprise a material under inspection; for example, in FIG. 1, the material can be part of a scene, an environment, an area, an object, or the like. The system 100 comprises a laser scanning module 104, a computing module, and a target area 108 under inspection, such as a concrete pour at a construction site. Generally, in use, the laser scanning module 104 operates to scan the target area 108 in order to generate imaging data. The imaging data can be analyzed by the computing module to determine the presence or absence of condition of interest, such as surface inconsistencies, that can be determined through a series of distance measurements. The imaging data may comprise a set of data points in a coordinate system, for example representing the external surface of the target area. A 3D image of the target may be reconstructed from the imaging data to assist in the analysis, or to provide visual representation to a user for evaluation.

Laser scanning module 104 comprises a light source emitting a laser beam, at least one photodetector, and a controller device. Generally, the laser beam is modulated by a modulation signal that may be generated within the laser scanning module 104, for example by a signal generator. The modulated laser beam may be amplitude modulated, or modulated in any other suitable way for carrying out the desired scanning operation. The laser beam is deflected by a beam steering device, such as a mirror, to a target point at the target area 108. The beam steering device can be used to continuously scan the laser beam over a series of target points, such as by raster scanning technique. The laser beam is reflected off the surface of the target area at the target point and returns to the laser scanning module 104, where it is received by the photodetector. In some cases, the returning beam is directed by the beam steering device. The controller device of laser scanning module 104 is configured to determine the distance from the laser scanning module 104 to the target point on the target area 108. This can be determined from the propagation times of an output beam, travelling from the laser scanning module 104 to the target point, and a return beam, travelling from the target point to the laser scanning module 104. A phase shift between the output beam and the return beam is determined and evaluated for this purpose. Imaging data comprising distance calculations, the distance calculations corresponding to phase shift measurements for a series of target points, can be passed to the computing module (or distance module) for processing and analysis. In some cases, the distance module can be the same or separate from the computing module. In some embodiments, machine learning and other signal processing techniques are applied to the imaging data.

The computing module of system 100 comprises a local computing module 116, which may be communicatively linked, for example via a network 120, to a remote computing module 124. The computing module may be used for processing and analysis of imaging data provided by the laser scanning module 104. Further, the remote computing module 124 may host a user-accessible platform for invoking services, such as reporting and analysis services, and for providing computational resources to effect machine learning techniques.

System 100 may further comprise a reference object or surface, such as a reference bar 128, for use in analysis and/or calibration of imaging data, the reference bar 128 having known positioning and dimensions. The reference bar 128 may also provide a reference for use in determining the relative positioning of imaging data along the target area 108.

In some variations, such as shown in FIG. 1, the system 100 includes a plurality of laser scanning modules 104. The laser scanning modules may be placed in strategic locations around the target area 108, thereby allowing access to and scanning of the entire target area 108. Multiple scans of the same target area 108 can be referenced to a single reference system using positional targets, such as reference bar 128. The positional targets assist during a registration phase wherein a single scan model of the target area can be built from the 3D scan data. Not using a reference system in this manner when performing multiple scans for a target may result in the relative error of each point of an imaging data array (e.g. point cloud) negatively affecting a final scan model.

The plurality of laser scanning modules may be configured according to a master-slave architecture having a master and a slave, as in system 100. As shown in FIG. 1, a master laser scanning module 132 is configured to communicate instructions 136 related to scanning operations to the plurality of laser scanning modules 104, each acting as a slave. Master laser scanning module 132 may be substantially similar to laser scanning module 104 and carry out laser scanning operations in addition to communicating instructions. In some implementations, the master laser scanning module 132 is connected to a local computing module 116 having a computational model for effecting machine learning techniques. In alternative embodiments, the computational model may be distributed by the local computing module 116 of the master laser scanning module 132 to the local computing modules 116 of the slave laser scanning modules, such that machine learning techniques can be effected on imaging data at an individual slave laser scanning module.

The communicated instructions 136 may relate to motion control of laser scanning module 104. In some cases, motion control of the laser scanning module 104 can be based on a motion control model. Each laser scanning module 104 of system 100 may include an actuation mechanism and controller, for effecting motion control based on the motion control model. Motion control may facilitate, for example, rotation of the laser scanning module 104 about a first (x-) axis 140 or second (z-) axis 144. Processing and analysis of imaging data from a first scanning operation may result in instructions being communicated to the motion control system of the laser scanning module 104 so as to effect movement of the laser scanning module 104 in preparation for a second scanning operation. In variations, the determination and instructions relating to motion control of the laser scanning module 104 between scanning operations may be generated at the slave laser scanning module or local computing module 116 of the slave laser scanning module, or at the master laser scanning module 132 or local computing module 116 of the master laser scanning module 116, or some combination thereof.

Other implementations of system 100 contemplate configurations and methods to decrease the number of scan positions necessary for the laser scanning module or modules to assume in order to obtain a complete scan of the target 108. One such variation utilizes automated systems to reposition the laser scanning modules. This may be achieved by having the laser scanning module positioned on or connected in some fashion to a robotic system or rover that can facilitate the coordinated movement of the laser scanning module around the target, and having instructions communicated in a manner and for purposes such as communicated instructions 136.

In an alternative embodiment, the number of scan positions may be decreased by establishing a computation model, for example at the computing module, for frequency of activity of interest that may prioritize one laser scanning module over another in order to focus on one location on the target. By doing so, the relative usefulness of a subsequent scanning event can be increased, and the system 100 can develop an understanding of what is changing in the environment of the target, allowing for a distribution of interest by the system across the target area.

In yet another embodiment, the system 100 includes a master scanning unit comprising a laser scanning module, such as master laser scanning module 132, and at least one slave scanning unit. The slave scanning unit comprises a beam steering device, such as a mirror galvanometer. The laser scanning module of the master scanning unit operates like master laser scanning module 132 or laser scanning module 104 to emit a laser beam, receive a return beam at a detector, and determine a distance traveled by the beam by a controller device configured for such purpose. The master scanning unit may also include an embedded local computing module 116. In such an arrangement, the laser scanning module of the master scanning unit includes a primary beam steering device configured to direct the laser beam emitted from the master scanning unit to a secondary beam steering device, the beam steering device of the slave scanning unit. Thus, the master scanning unit can direct a laser beam via the primary beam steering device to a desired slave scanning unit, which can direct the received laser beam to a desired location on the target via the secondary beam steering device. The return beam backscattered off the target area can be directed in a manner similar to the emitted beam, by deflecting off the secondary beam steering device of the slave scanning unit to the master scanning unit, where it may be deflected via the primary beam steering device to the detector. Signal processing techniques carried out at the laser scanning module itself (e.g. controller device), local computing module, or remote computing module can be used to correct the signal from the received backscatter. Master and slave scanning units may communicate in a manner and for purposes similar to communicated instructions 136 of system 100. This may be done via network 120 (e.g. Wi-Fi), or the need for connectivity may be obviated by having the scanning units cycle on a specific time on a shared clock, for example using a GPS time signal and a battery pack.

Figure 2:
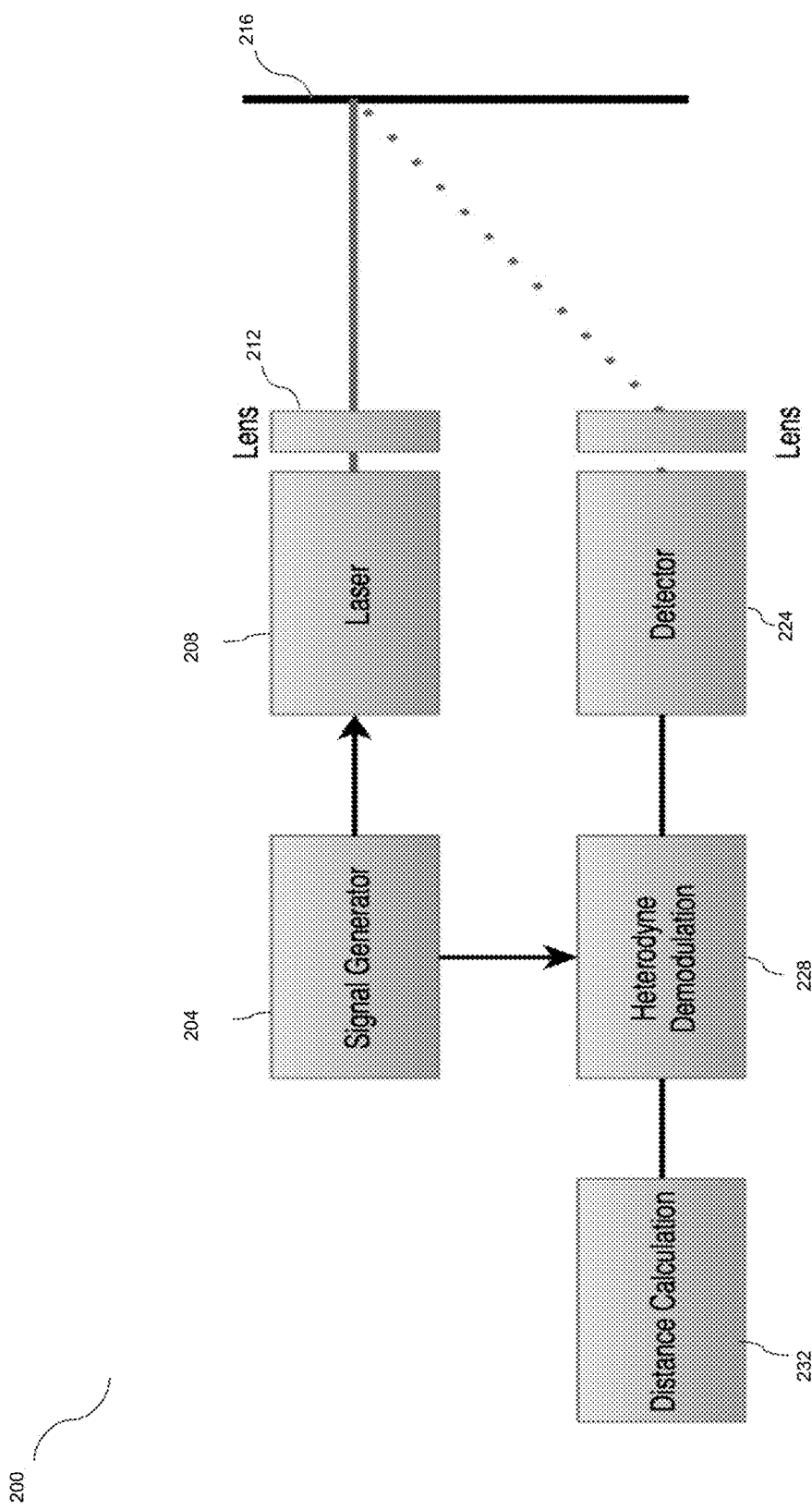
FIG. 2 shows a block diagram of a system for determining a distance from a laser scanning module to a target, in accordance with an embodiment.

Referring now to FIG. 2, shown therein is a block diagram of a system 200 for determining a distance from a laser scanning module 104 to a target 216, for generating imaging data via phase shift measurement modality, in accordance with an embodiment. System 200 comprises two subsystems, a laser emission system and a detection system. For the laser emission system, the laser emitter 208 is modulated by a signal generator 204, for example by amplitude modulation. In alternative embodiments, other forms of modulation may be used. Once modulated, the laser emitter 208 emits a beam that travels through a first optic 212, which in system 200 is a collimating lens. The emitted beam travels from the collimating lens 212 to a target point on the target 216, where it is backscattered from the target 216 towards a detector 224 (which may be present in the scanning module 104). The return beam is received by the detector 224, at which point it undergoes heterodyne demodulation 228. After heterodyne demodulation is completed and phase difference is determined, a distance calculation 232 can be performed. Distance calculation 232 may be carried out by a controller device (or distance module), such as an FPGA.

The frequency by which the laser emitter 208 is modulated via the signal generator 204 can be selected based on a desired range and precision of the system 200. In an embodiment, millimeter precision may be achieved by modulating the laser emitter 208 at around 100-120 MHz with a phase precision of 0.1 degrees. Simply using a frequency around 100 MHz may limit the range of the laser scanning module 104 to around 1 m, due to repeating phase of the laser past that length. Accordingly, in an embodiment, the laser emitter 208 is modulated with two frequencies. This may be done to achieve suitable precision (high frequency) and range (low frequency) necessary for the desired laser scanning operation.

In a particular embodiment, the laser emitter 208 can be modulated with a higher frequency of 100-120 MHz to give a suitable precision, and a lower frequency of approximately 3 MHz to give the scanning module 104 a range of approximately 100 m.

Figure 3:
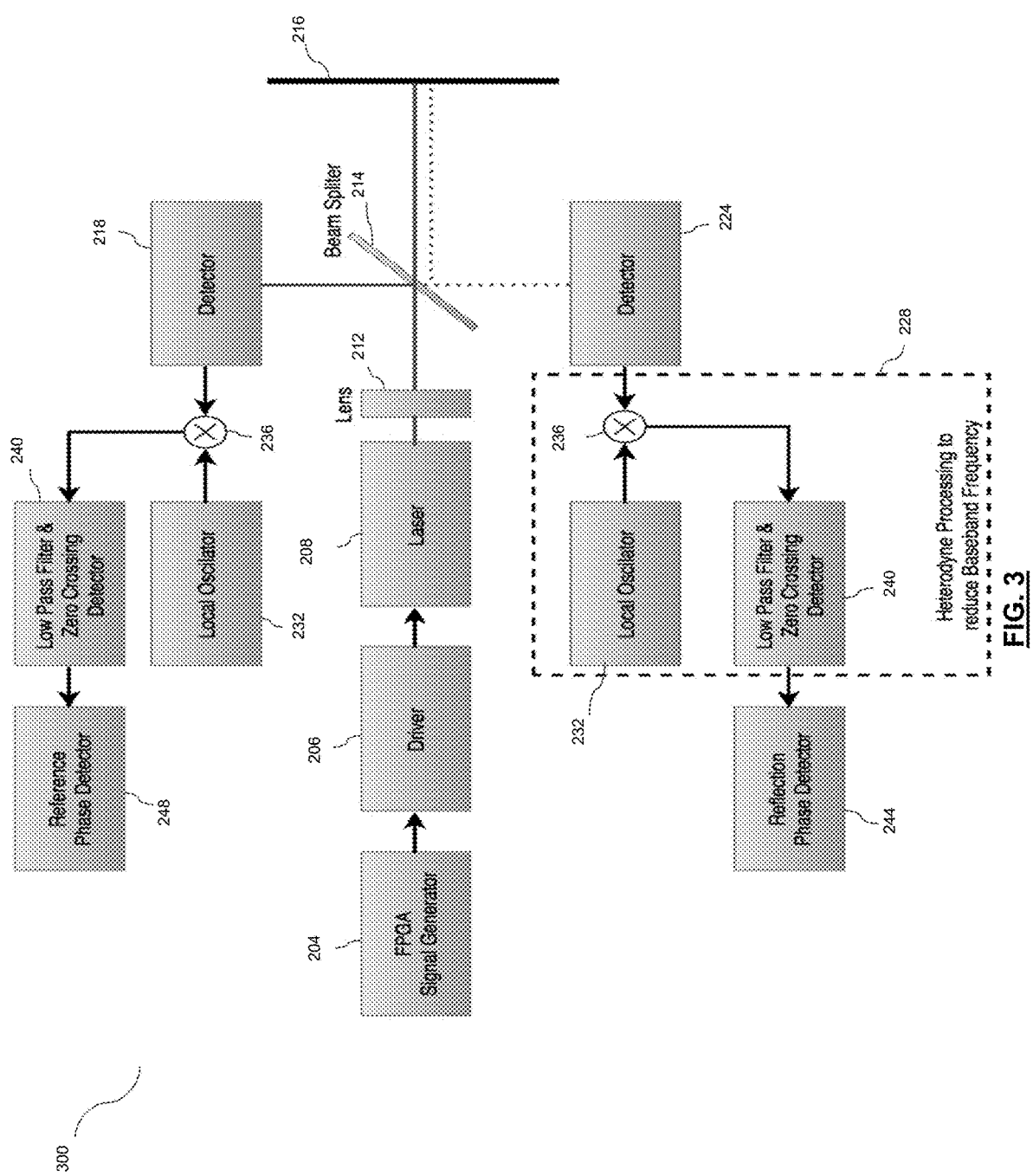
FIG. 3 shows a block diagram of a system for laser scanning a target in accordance with a phase detection modality, in accordance with an embodiment.

Referring now to FIG. 3, shown therein is a system 300 for detecting a phase difference in a light beam emitted from a laser emitter 208, for use in a laser scanning operation, in accordance with an embodiment. Signal generator 204 generates an output frequency with which a laser beam of laser emitter 208 may be modulated. In some implementations, the signal generator 204 comprises an FPGA. The output frequency of the signal generator 204 passes to a driver 206, resulting in the driver 206 changing the current supplied to the laser emitter 208. The current change effected by the driver 206 changes the optical power of the laser emitter 208. In some cases, the laser emitter 208 may have a built in photodetector connected to the driver 206 for creating a feedback loop for regulating the power control of the laser emitter 208.

Once the laser beam of the laser emitter 208 has been modulated, the beam is emitted and passes through collimating lens 212. In variations, the collimating lens 212 may be built into the laser emitter 208. The beam reaches a beam splitter 214, where the beam splitter 214 transmits a first portion of the incident beam, a measurement beam, through towards a target 216, and reflects a second portion of the incident target beam, a reference beam, towards a reference detector 218. In an embodiment, the beam splitter 214 is a 50/50 beam splitter. The reference beam serves as a reference for the phase shift calculation. The measurement beam travels through the beam splitter 214, and is backscattered off of the target 216, returning to the beam splitter 214, where the beam splitter 214 reflects a portion of the measurement beam towards the measurement detector 224. In some implementations, a second optic is present for focusing the backscattered light in the measurement beam onto the measurement detector 224. In some variations, the reference detector 218 and measurement detector 224 may be different kinds of photodetectors. For example, the measurement detector may comprise an avalanche photodiode. Measurement and reference signals are passed from their respective detectors 224, 218 to a heterodyne module.

In an alternative embodiment, a frequency signal can be applied directly to a reference mixer (from signal generator) in the heterodyne module without first undergoing conversion to light in laser emitter and conversion back to an electrical signal in the reference detector. Using such an electrical approach may carry advantages such as a reduction in size and cost. Using an optical approach, on the other hand, may assist in eliminating common mode laser noise.

Once the measurement beam and reference beam have been received by the measurement detector 224 and reference detector 218, respectively, the signals undergo heterodyne demodulation 228. Heterodyne demodulation 228 is necessary to lower the frequency of the signals, as it can be difficult to work with a high frequency (for example, 100 MHz). For the heterodyne demodulation operations, the system 300 comprises a local oscillator 232, analog mixer 236, and low pass filter and zero crossing detector 240. The local oscillator 232 is an oscillator having a frequency near the frequency of the desired signal. For the measurement beam, the signal passes from the detector 224 to the analog mixer 236 where it is combined with the local oscillator 232. The analog mixer 236 produces two frequency outputs: a sum, comprising the sum of the detector frequency and the oscillator frequency, and a difference, comprising the difference between the detector frequency and the oscillator frequency (having a lower frequency output). The output signal(s) are passed from the analog mixer 236 to the low pass filter/zero crossing detector 240. The low pass filter removes the high frequency portion of the output signal, which can be done in hardware (e.g. electronic circuit) or in software. A similar process occurs for the reference beam. Once the output signals of the measurement and reference analog mixers 236 have been shaped by the zero crossing detector, the measurement phase detection 244 and reference phase detection 248 can be compared to determine the phase shifting between the two signals.

In an embodiment, the measurement signal and reference signal (pulses) can be compared and a corresponding phase shift measurement calculated by use of a reference clock. The reference clock may be included with the signal generator 204 (e.g. FPGA). The reference clock may be passed through a phase locked loop (PLL) to increase the clock, and the difference in pulses can be counted. There is one pulse that is high (the reference pulse), and the measurement pulse is deviated somewhat in time. The resulting time difference between reference and measurement pulses can be counted and, through calculation, the difference in distance can be determined. In some variations a microcontroller may be connected to the heterodyne demodulation module, the microcontroller configured to perform calculations on the signals to determine a distance value.

Figure 4:
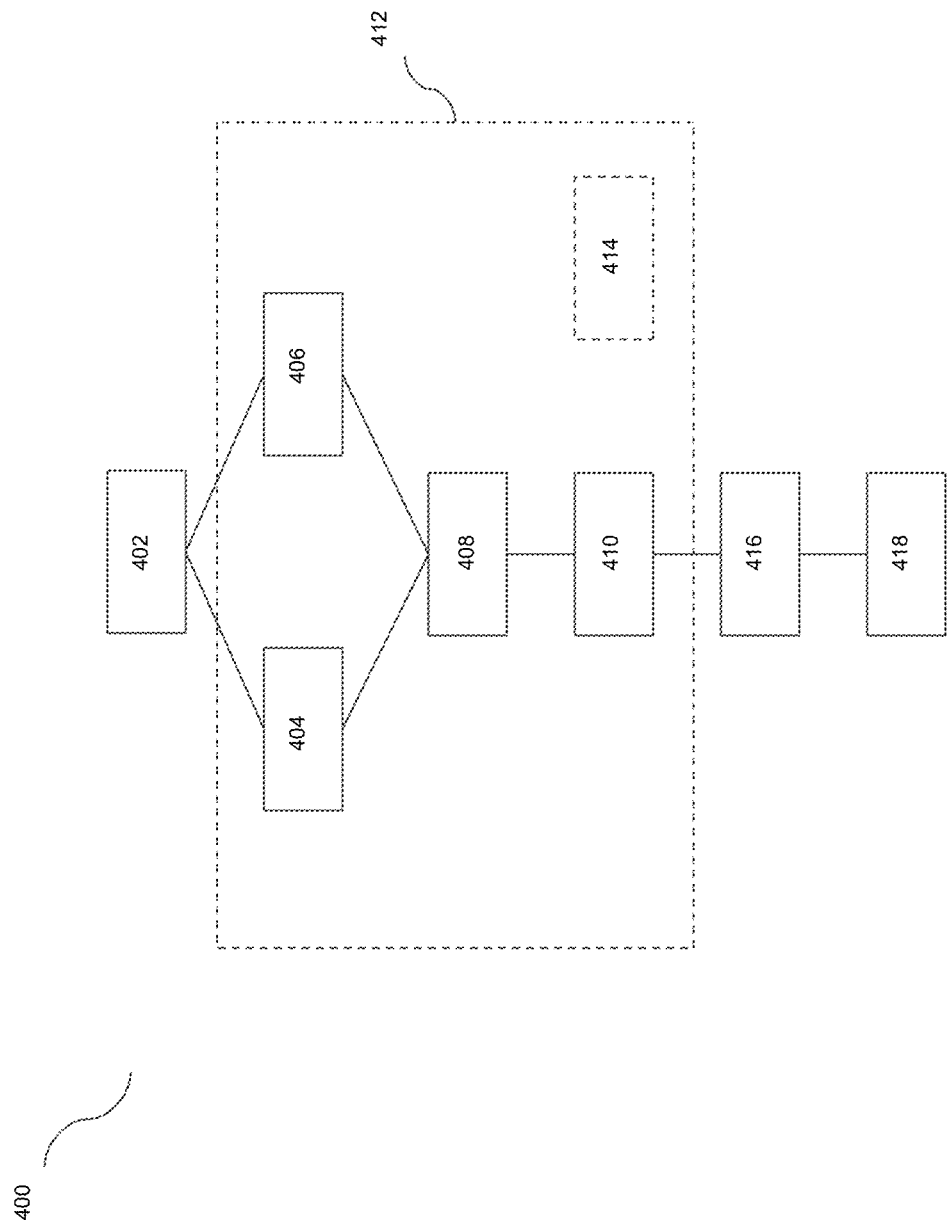
FIG. 4 shows a method of scanning an environment using a laser scanning system, in accordance with an embodiment.

Referring now to FIG. 4, shown therein is a method 400 of scanning an environment using a laser scanning system, such as system 100, in accordance with an embodiment. The method 400 may be used for scanning the surface of a target area, the target area comprising a material, in particular for the purposes of detecting defects (for example, irregularities, elevation differences/variances, or the like) in the surface. The method may further determine the relative location of any determined defects. The method aggregates imaging data generated by the laser scanning module 104.

At block 402, the laser scanning module scans the target area. The laser scanning module 104 scans the target area via a laser scanning imaging modality. In doing so, light backscattered from the surface of the target area is received by a photodetector of the laser scanning module 104. A distance measurement can be calculated for an individual target point at the target area, and distance measurements for a series of target points can be generated by having the laser scanning module 104 effect a raster scan over the target area. In the process of receiving the backscattered light and outputting a distance calculation, the corresponding analog electrical signal is converted to a digital output.

At block 404, the computing module, for example local computing module 116, receives imaging data from the photodetector of the laser scanning module 104, the imaging data comprising a set of data points in a coordinate system (e.g. a data point having x, y, z coordinates). Mathematical calculations may be carried out on the imaging data, for example to simplify data manipulation and analysis.

At block 408, the computing module aggregates the imaging data from the laser scanning module 104 collected at block 404. The aggregation technique may involve stacking images comprising the imaging data according to image processing techniques. In an embodiment, aggregation of imaging data includes generating a point cloud from a set of data points in a coordinate system. Aggregation of imaging data may comprise the use of point set registration techniques. Such registration may include aggregating imaging data inputs from multiple different perspectives (which may be achieved, for example, by physically moving the laser scanning module or by having a plurality of laser scanning modules at different positions).

As illustrated by block 412, denoising and other image processing techniques may be carried out at various blocks of method 400. Image processing techniques include applying Fourier transforms, wavelet transforms, applying filters, thresholding and edge detection techniques to imaging data. Other image processing techniques would apply to those of skill in the art. Denoising may include applying motion compensation to the imaging data. Motion compensation may comprise the determination of a motion vector relating to motion of the object during imaging, and compensation for any distortion or defects computed to be introduced by the determined motion of the object as indicated as indicated by the motion vector. The motion vector may be determined using sensor readings from an accelerometer coupled to the target, laser scanning module, or other moving component, or by other suitable techniques. Denoising may also include the application of other image stacking mechanisms and techniques.

At block 414, optionally, imaging data may be received from multiple stages of a multi-stage scanning operation. For example, in the construction context, imaging data may be received from different perspectives of a target area, such as a concrete pour. The imaging data from multiple perspectives may be cross-correlated in order to more accurately determine the presence of defects in the target area surface. For example, the presence or absence of a surface defect at one stage of inspection for a particular location of a target area, may be cross-correlated to measurements of the same location of the target area at a different perspective in order to generate a global value indicating the likelihood of the presence of a surface defect at the particular location of the imaged area.

At block 416, once the imaging data is aggregated, it may be analyzed in order to determine the presence of any defects or irregularities in the surface of the target area. In addition, the determined motion vector may be used for the determination of the relative position of any determined defects. The relative position of a surface defect may be used for remediation efforts.

At block 418, an output may be generated in response to the determination of the condition of the target (for example, detection of defects), as well as optionally the location of such defects or problem areas in the target area. The output may effect a state change in a workflow operating using operational states, in a manner similar to a finite state machine. For example, an output indicating the absence of surface defects during a concrete pour and inspection workflow state may be processed by the computing module and may cause a change of operational states, which may result in the entering a different stage of the pour process (e.g. remediation).

Figure 5:
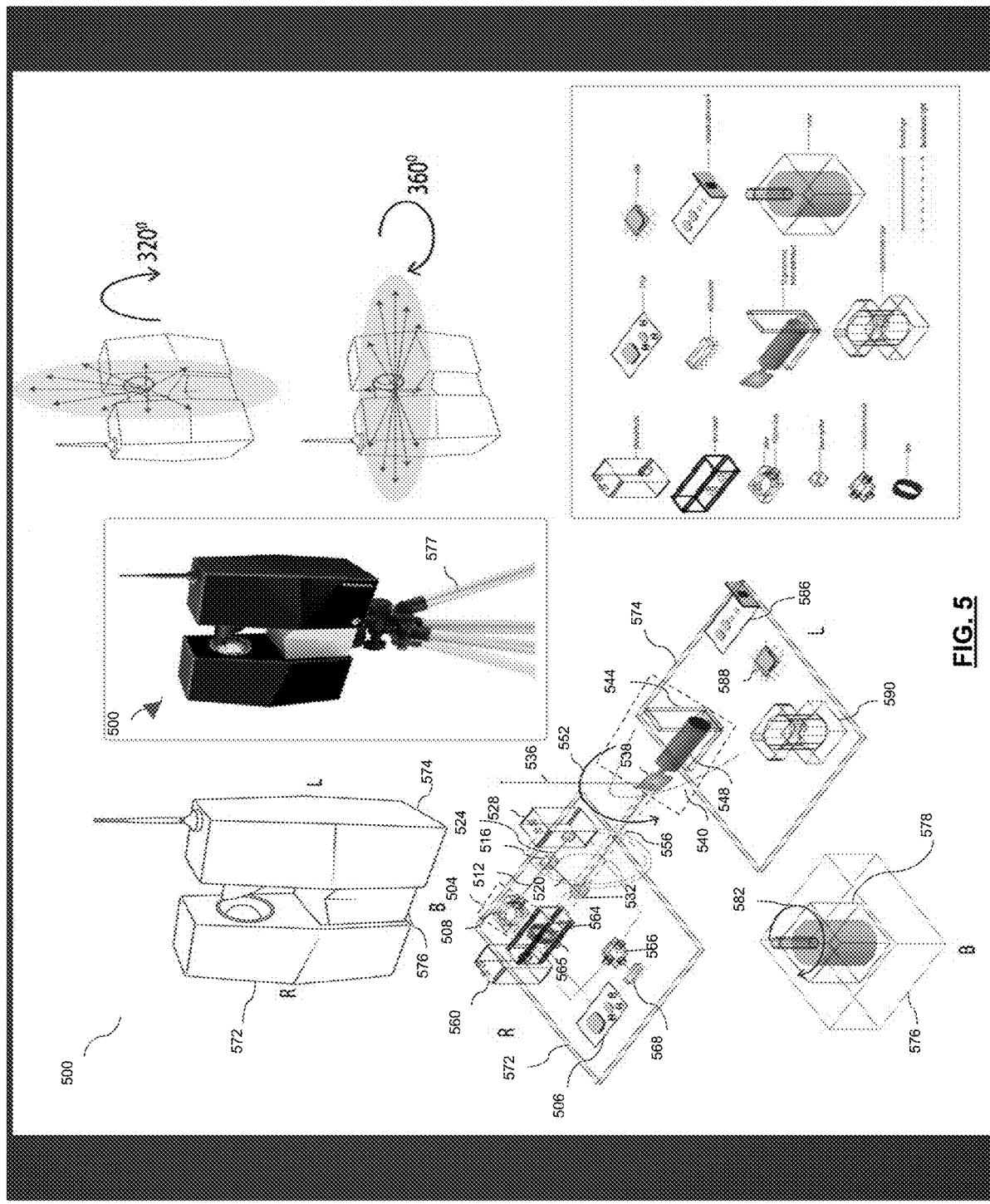
FIG. 5 shows a laser scanning module for use in an integrated laser scanning and signal processing system, in accordance with an embodiment.

Referring now to FIG. 5, shown therein is a laser scanning module 500, for use in an integrated laser scanning and signal processing system, in accordance with an embodiment. The laser scanning module 500 is communicatively linked to a computing module (not shown), for example local computing module 116 or remote computing module 124. The laser scanning module 500 generates imaging data for a plurality of points on a target, each point corresponding to a distance measurement. In an embodiment, imaging data corresponding to a series of distance measurements is acquired by using a phase shift measurement modality wherein a distance to a target is determined through the use of an emission light beam and a reception light beam. The imaging data can be processed, analyzed, and aggregated, for example into a three dimensional model, through signal processing techniques, which may include the application of machine learning techniques (e.g. neural networks), and may be further analyzed for a condition of interest in the target such as a defect.

The laser scanning module 500 comprises a light source 504, at least one photodetector, and a controller device 506 communicatively linked to the light source 504 and the at least one photodetector. The light source 504 comprises a laser driver 508 having a laser diode configured for emitting a laser beam 512 towards a given point on the target. Some characteristic of the laser beam 512 is modulated by a signal generated by a signal generator and passed to the laser driver 508 of the light source 504. In some implementations, the optical power of the laser beam 512 is amplitude-modulated. The controller device may function as the signal generator for generating the modulation signal of the laser beam 512. Where, as in laser scanning module 500, some or all of the controller device 506 functions are carried out by an FPGA, the FPGA may generate the signal for modulating the laser beam 512. In a particular embodiment, the laser beam 512 has an approximate wavelength of 1550 nm.

The laser beam 512 travels from the light source 504 and reaches a first beam splitter 516, where the laser beam 512 is split into a measurement beam 520 and a reference beam 524. In laser scanning module 500, the measurement beam portion 520 of laser beam 512 is transmitted through the first beam splitter 516, while the reference beam portion 524 of the laser beam 512 is deflected by the beam splitter 516 at a desired angle. The ratio of the transmitted portion of the beam and reflected portion of the beam can be any ratio suitable for generating the desired signals for the laser scanning operation (e.g. 50/50, 90/10, etc.). The beam splitter 516 may comprise any appropriate material for beam splitting known in the art, such as glass or fiber optic assembly.

Once deflected by the beam splitter 516, the reference beam 524 travels to strike a reference photodetector 528. Meanwhile, the transmitted measurement beam 520 is directed via the first beam splitter 516 to a second beam splitter 532. Upon reaching the second beam splitter 532, the measurement beam 520 is split into a first and second portion. The first portion, a target measurement beam 536, is deflected via the second beam splitter 532 to strike a mirror 538 of a beam steering device 540, the mirror deflecting the target measurement beam 536 towards the target point on the target being scanned. In laser scanning module 500, the beam steering device 540 includes a one-dimensional mirror galvanometer comprising mirror 538 and a mount 544. Though FIG. 5 shows a one-dimensional mirror galvanometer, other beam steering mechanisms are contemplated including a two-dimensional mirror galvanometer, a MEMs-based scanning mechanism, a rotating scanner, or other suitable means. The beam steering mechanism 536 may be controlled electromechanically, by programmable software, by the computing module or other suitable means.

As shown in laser scanning module 500, the mirror 538 of beam steering device 540 may be positioned at one end of a cylinder 548, and may be connected to a rotary drive via a shaft. In such an embodiment, the rotary drive can cause rotation 552 of the mirror 538 about a horizontal axis. In an embodiment, a given rotary position of the mirror 538 may be determined through the use of an electromechanical device, such as a rotary/shaft encoder, that converts the angular position or motion of the shaft to an analog or digital code. Output signals of the rotary encoder can be sent to the controller device 506.

The target measurement beam 536, having reflected off the target at the target point, returns along a return path to the laser scanning module 500 as return measurement beam 556 and is deflected by the beam steering device 540 to the second beam splitter 532. At this stage, a portion of the return measurement beam 556 is transmitted by the second beam splitter 532 and strikes a measurement photodetector 560. Prior to striking the measurement photodetector 560, the return measurement beam 556 transmitted by the second beam splitter 532 may pass through a lens 564 having a lens mount 565, as in laser scanning module 500, in order to focus the return measurement beam 556 at the measurement photodetector 560.

The measurement photodetector 560 generates a measurement signal corresponding to the received return measurement beam 556, and the measurement signal is passed to a heterodyne module 566. During the process of recovering the measurement signal at the heterodyne module 566, the reference photodetector 528, having received the reference beam 524, generates a corresponding reference signal which is sent to the heterodyne module 566. The heterodyne module 566 performs analog mixing and heterodyne demodulation (to lower the frequency) of the measurement and reference signals, in order to determine the phase difference.

The demodulated measurement and reference signals are passed from the heterodyne module 566 to an analog-to-digital converter ("ADC") 568, where the demodulated signals are converted into digital outputs. The digital outputs are sent from the ADC 568 to the controller device 506 for processing including phase difference calculations. Phase difference measurements can then be used to calculate the distance corresponding to a particular target point scanned by the laser scanning module 104.

The laser scanning module 500 has a housing structure comprising a first compartment 572, a second compartment 574, and a third compartment 576. The third housing compartment 576 may comprise a base upon which the first and second housing compartments 572, 574 are positioned. Light source 504, measurement and reference detectors 560, 528, first and second beam splitters 516, 532, controller device 506, ADC 568, heterodyne module 566, lens/lens mount 565 are contained within the first housing compartment 572. The second housing compartment 574 contains aspects of the beam steering device 540 responsible for movement of the mirror 538, while the mirror 538 of beam steering device 540 extends from within the second housing compartment 574 into the space between the first and second housing compartments 572, 574, the mirror 538 configured approximately equidistant between the compartments.

The third housing compartment 576 may be positioned on a stand, such as stand 577. The third housing compartment 576 includes a motor 578 for enabling rotation/movement 582 of the laser scanning module 500 about a vertical axis. The third housing compartment 576 may further include a rotary encoder for assisting in a determination of the rotational position of the motor/rotary drive. The output signals of the encoder can be sent to the controlling device 506. The vertical axis about which the laser scanning module 500 can rotate may together with the horizontal axis define an axial intersection point, the axial intersection point lying approximately centrally on the mirror 538 of the beam steering device 540. This axial intersection point may define the origin of a system of coordinates to which all distance measurement values may be mapped.

The controller device 506 (shown as an FPGA in FIG. 5) may also implement aspects of motion control for the laser scanning module 500. This may include measuring the relative location of a moving laser scanning module 500 based on proximity sensor inputs. A given determination of the relative location of the laser scanning module 500 may result in an adjustment and movement of the scanning module 500 to a desired location. For example, such movement may be implemented by a motor present in or connected to the scanning module 500. In some variations, the motor may facilitate rotation of the scanning module 500 about an axis. The motor may be housed within the third compartment 576, such as motor 578. Laser scanning module 500 may also have focal plane compensation comprising focal plane actuation, such as by actuation of the lens 564 or other component of the optical system of scanning module 500. Such focal plane actuation may be effected by voice coil motor or other suitable actuation technique controlled by the controller device (FPGA) 506.

Laser scanning module 500 further comprises an external interface 586, for communicatively linking the laser scanning module 500 to a computing module via a network. This may be done by industry standard, such as for example WLAN, Ethernet, USB, or the like. In an embodiment of laser scanning module 500, external interface 586 is a network cable/WIFI port.

Laser scanning module 500 may be further enhanced with compute resources such as a chip processor 588 (e.g. system-on-a-chip (SoC)), which may be used to run software. In some cases the compute resources may be used for effecting machine learning techniques on the imaging data. The chip processor 588 may comprise a number of components, connected by a bus, such as: a microcontroller, microprocessor, or digital signal processor; memory blocks; timing sources; peripherals; external interfaces; analog interfaces (ADCs, DACs); or voltage regulators. In an embodiment, such enhanced compute resources are provided by an ARM (advanced reduced instruction set computing (RISC) machine) processor, which may be disposed in the second housing compartment 574.

Further, power is supplied to the laser scanning module 500 by a power supply/module 590, which may comprise a battery or power input device.

Figure 6:
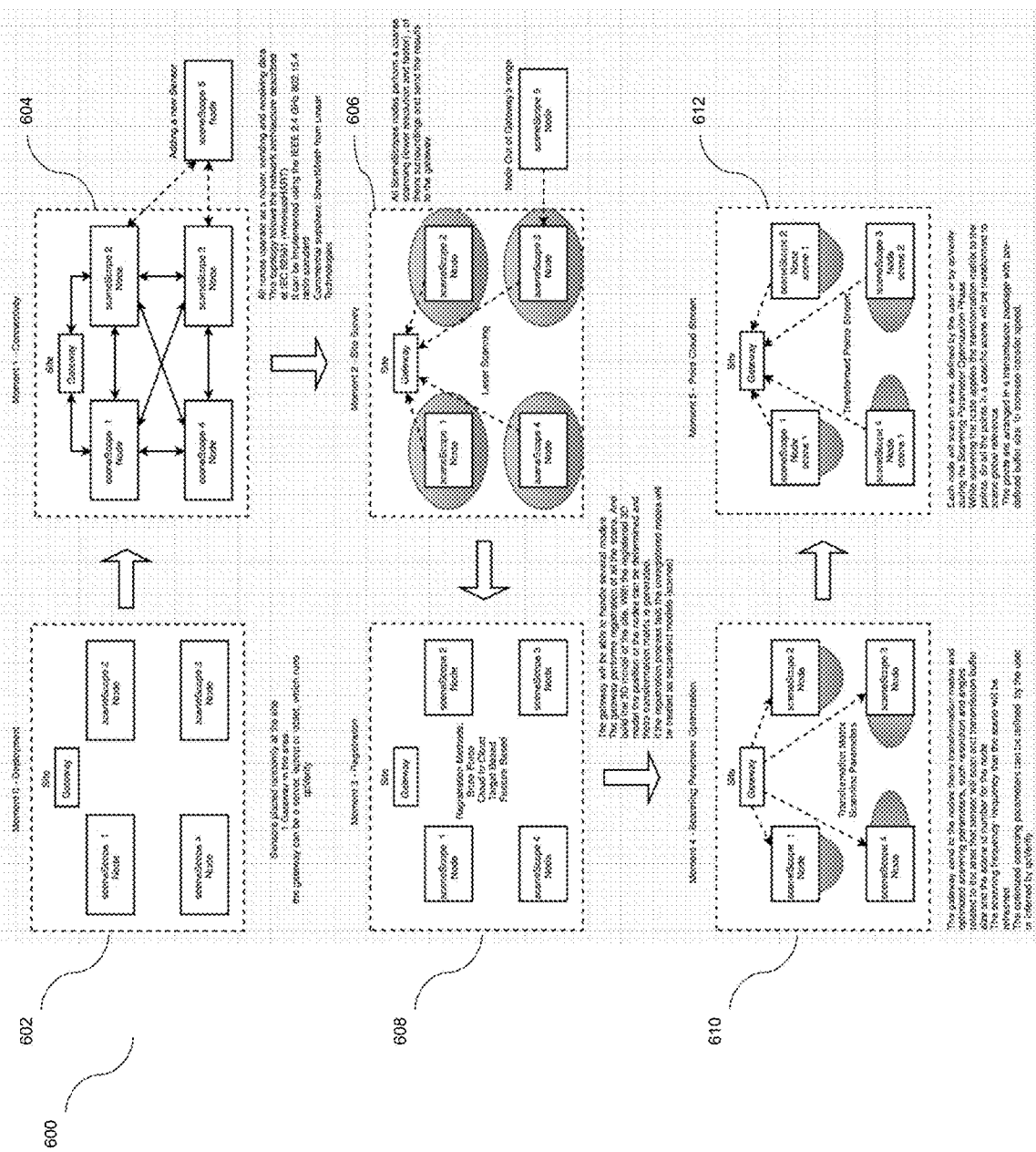
FIG. 6 shows a distributed control design system for use in a laser scanning operation, in accordance with an embodiment.

Referring now to FIG. 6, shown therein is a distributed control design system 600 for use with a laser scanning system, in accordance with an embodiment. The system 600 comprises a site, a gateway, and a plurality of laser scanning modules each comprising a node. At block 602, a deployment operation is performed wherein a plurality of sensors each comprising a laser scanning module are placed randomly around the site. A sensor may comprise a laser scanning module. The gateway is present in the area and may be for example a server, laptop, tablet, or the like, that runs software for applying machine learning techniques. The software may be present on local computing module or remote computing module. At block 604: Connectivity, all nodes operate as a router, sending and receiving data. This topology follows a network architecture described at IEC 62591 (Wireless HART). It may be implemented using the IEEE 2.4 GHz 802.15.4 radio standard. At block 604 a new sensor may be added.

At block 606, a site survey operation is performed by the system 600. Each of the laser scanning module nodes perform a coarse scanning operation (e.g. lower resolution and higher speed) on its surroundings and sends the results to the gateway. Note that node 5 is out of the range of the gateway.

At block 608, a registration operation is performed. Registration techniques may include brute force, cloud to cloud, target based, feature based, etc. The gateway may be able to handle several models. The gateway performs out registration operations of scans taken during the site survey at block 606 and builds a three dimensional (3D) model of the site. By using the registered 3D model the position of the nodes can be determined and a transformation matrix generated. If the registration process fails, the unregistered nodes can be treated as separate models (scenes).

At block 610, a scanning parameter optimization is performed. The gateway sends to the nodes the transformation matrix and optimized scanning parameters, including such resolution and angles related to the area that the sensor may scan along with transmission buffer size and a scene ID number for each node. The scanning frequency may be the frequency at which the scene may be refreshed. Optimized scanning parameters can be defined by a user or inferred by the software for applying machine learning techniques.

At block 612, a point cloud stream is performed. Each node in the system scans a defined area, the defined area defined by a user or inferred by the software for applying machine learning techniques during scanning parameter optimization at block 610. During scanning, the node applies the transformation matrix to the points, so that all the points in a specific scene can be transformed to scene global reference. The points may be arranged in a transmission package with pre-defined buffer size to increase transfer speed.

Figure 7:
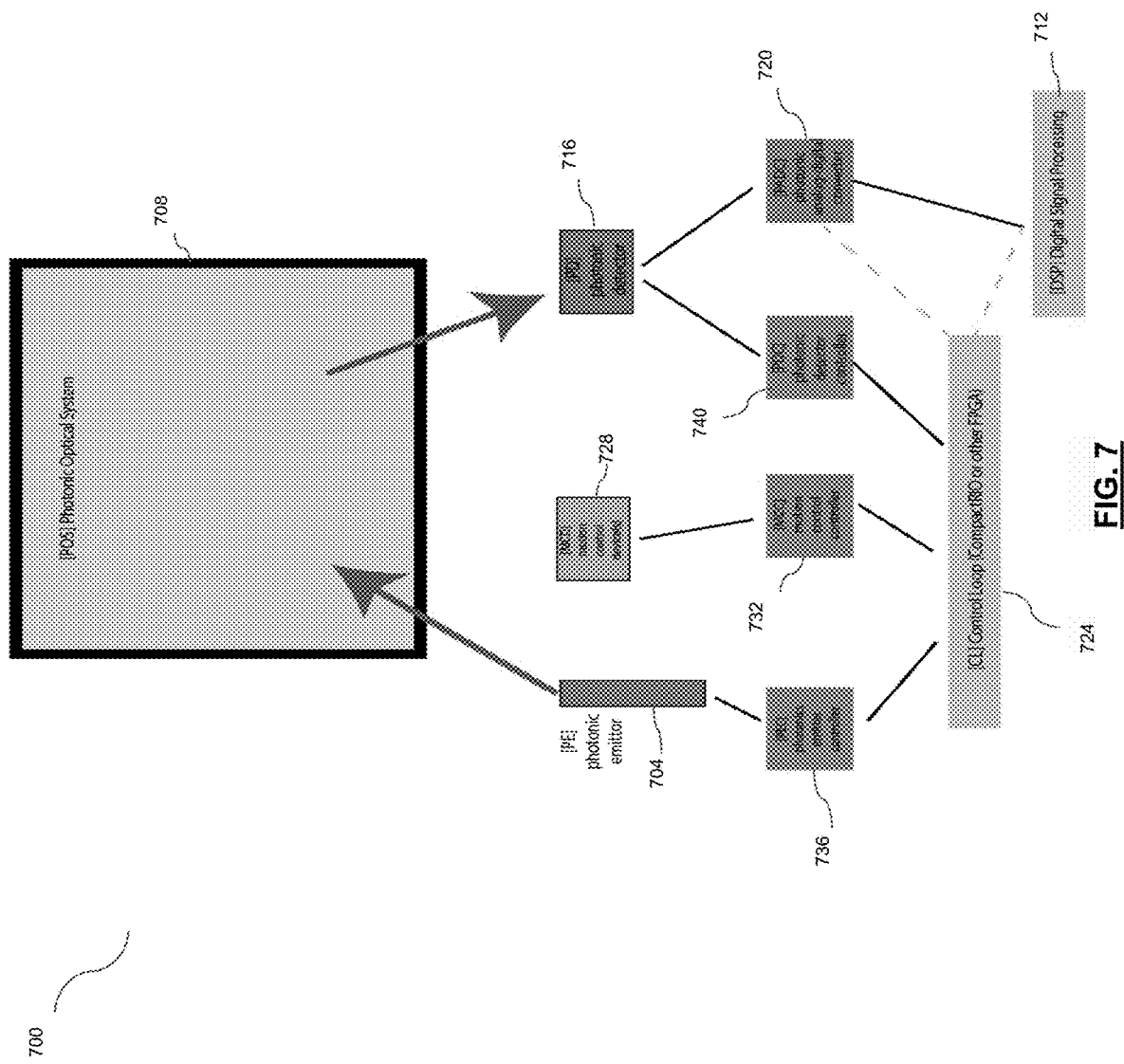
FIG. 7 shows a block diagram of a system for laser scanning having an integrated motion control system, in accordance with an embodiment.

Referring now to FIG. 7, a system 700 for laser scanning having a motion control system including a motion control model and actuation is shown, in accordance with an embodiment. The system 700 includes a photonic emitter 704, optical system 708, and digital signal processing unit 712. The photonic emitter 704, optical system 708, and a detector 716 may together compose a laser scanning module, such as laser scanning module 104. The photonic emitter 704 may be a laser or other appropriate light source for performing a scanning operation. The photonic emitter 704 is directed to the target through the optical system 708. The optical system 708 carries out a scanning operation on the target, in accordance with a laser scanning modality, such as phase shift measurement, to generate a signal. The signal received by the detector 716 is converted to a digital signal by a photonic analog-digital converter 720. The digital signal processing unit 712 applies signal processing functions and techniques to the digital signal.

Aspects and processes of system 700 may be controlled by a control loop 724. The control loop 724 may be implemented in order to increase automation and optimization of scanning operations and to minimize the need for human intervention. Motion of the laser scanning module 104 comprising the optical system 704 is controlled by a motion controller device 728. The motion controller device 728 can actuate aspects of laser scanning module 104 to carry out desired movements, including moving the laser scanning module 104 relative to the target area. Such movement may include rotation about horizontal or vertical axes. For example, in an embodiment, the motion controller device 728 facilitates up to approximately 320 degree rotation of the laser scanning module 104 about a horizontal axis and up to approximately 360 degree rotation about a vertical axis. The motion controller device 728 may be controlled by a motion control controller 732, such as a microcontroller, which may be implemented as part of the computing module.

In some cases, system 700 may include a high frequency actuation mechanism, such as voice coil motor actuation, for assisting real-time depth of field compensation to correct for distortion caused by movement of the target area relative to the laser scanning module 104. Such high frequency actuation mechanism may move the laser scanning module 104 and/or aspects of the optical system 704 (e.g. lens).

The photonic emitter 704 of system 700 is controlled by a photonic emitter controller 736, with the photonic emitter 704 configured to emit light according to the laser scanning modality employed. The photonic detector 716 may be controlled by a photonic detector controller 740. The motion control controller 732, photonics emitter controller 736, and photonic detector controller 740 may all be communicatively linked in control loop 724, which may comprise an FPGA or other device suitable for carrying out the desired tasks. The control loop 724 may be communicatively linked to the digital signal processing unit 712.

Motion control and actuation of the laser scanning module 104 may be based on and driven by a motion control model. In some cases, the motion control model can be configured to assist in real-time system configuration changes such as to compensate in response to distortion caused by movement relative to the target. The motion control model may utilize as an input pre-existing knowledge of object geometries in order to drive actuation. Alternatively, the model may rely on real-time determination of object geometries, such as through the use of a positional sensor, which may be located on the laser scanning module 104. The motion control model may leverage digital signal processing techniques in executing motion control of the laser scanning module 104.

In an embodiment, the system 700 may have implementation of the motion control model wherein a motion control action is first completed on the laser scanning module 104. Next, a photonic emission takes place. Next, a second motion control action is completed. Next, a photonic detection operation is carried out. Next, a third motion control action is completed.

The motion control model may be scaled down to an individual laser scanning module 104 in a distributed system. In some variations, the motion control model is distributed to the local computing module 116 of an individual laser scanning module 104 and the remote computing module 124. In such variations, the remote computing module 124 may perform orchestration operations. The local computing module and remote computing module 124 may comprise master-slave architecture with distributed motion control methodology.

Motion control of system 700 or other systems and methods described herein may include focal plane management techniques for scanning of objects having complex geometries by the laser scanning module and other purposes. In an embodiment, the system 700 may develop and/or employ focal plane management techniques based on a geometric model of the target 108. In some cases, the geometric model of the object may be pre-existing and known, such as with a CAD model of the object, or may be generated in real-time during a scan by the laser scanning module 104. The present disclosure contemplates at least four different motion control techniques that may be used individually or in some combination of two or more. Geo-positioning comprises motion control effecting movement and positioning of the laser scanning module 104. In some instances, the laser scanning module 104 can include a mounting device. For example, in some variations geo-positioning motion control influences where the laser scanning module is positioned relative to the object. Pointer-positioning comprises a motion control model and actuation influencing where the laser scanning module is pointing. In other words, pointer-positioning may control a robot arm or the positioning and/or movement of the laser scanning module relative to the mounting device. Beam positioning comprises a motion control system influencing the positioning of the laser beam emitted from the light source of the laser scanning module relative to the target. Beam positioning may be effected by a beam steering device, such as beam steering device of the laser scanning module, controlled by motion control system. Optical positioning may include controlling the positioning of the focal plane of the optical system within the laser scanning module via a motion control system. This may include moving a lens or other component of the optical system in order to manage the focal plane length. In some cases, actuation for these motion control techniques may be achieved, for example, through the use of voice coil actuation or other high speed focal plane management technique, where appropriate.

In an embodiment, the laser scanning systems described herein can be used in carrying out a method for concrete pour inspection. An area of interest, which is to be evaluated, can be first identified and isolated from the entire scene being scanned. A signal is acquired by the laser scanning module and sent to computing module, where it is filtered and denoised, and the area of interest can be segmented. A surface plane can be fit and a heat map derived based on an elevation deviation, thereby offering visualization of variance in elevation which in some cases may be at a millimeter resolution. In some variations, the deviation in elevation for a scan point is identified. A scan point that lies below the surface plane is given a first identifier, such as a first colour. A scan point that lies above the surface plane is given a second identifier, such as a second colour. A scan point that lies between may assume a value that lies between the first and second identifier, such as a colour between a first colour identifier (e.g. blue) and a second colour identifier (e.g. red). Further, a scan point lying close to the surface plane, where "close" is designated as the point reaching a desired closeness threshold, can be given an identifier such as a colour; for example, having a value between the first and second identifiers (e.g. colour green). A scan point lying outside the identified range can be given no identifier (colour), or an appropriate identifier. The computing module can output the generated heat map, for example via output interface #, to a user for observation. A user may look at the generated heat map and observe the presence and location of irregularities in the area of interest, and may determine any corresponding corrective action. Alternately, evaluation of the heat map and any corresponding determination or execution of corrective action may be done by automatically by one or more components of the system with minimal or no human intervention.

Figure 8:
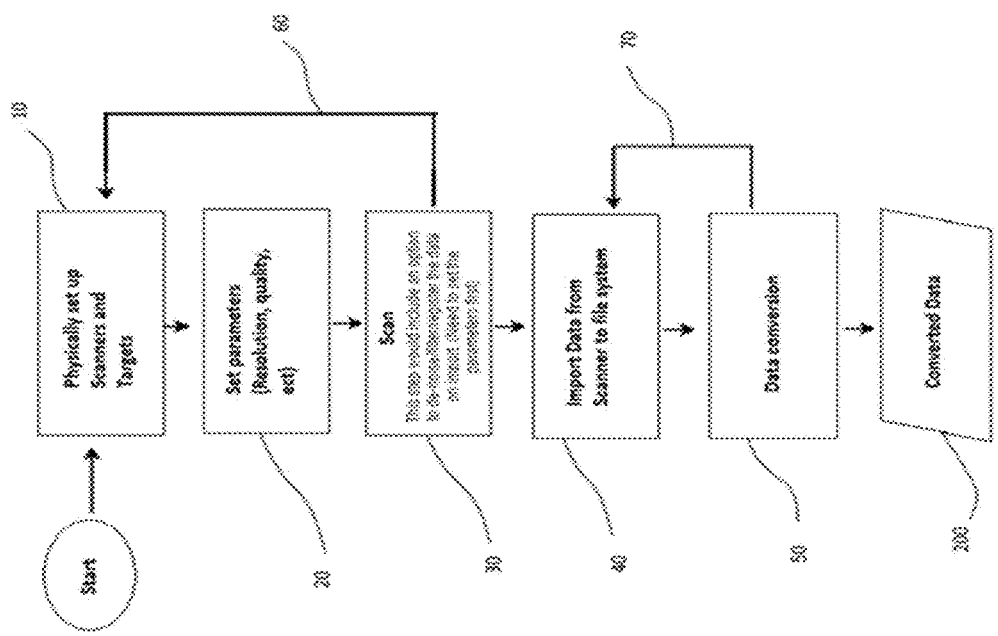
FIG. 8 shows a flow diagram of a method for acquiring data for concrete quality inspection in accordance with an embodiment.

As mentioned previously, embodiments of the present disclosure may directed to the inspection of concrete or reinforced concrete and acquire openly accessible data using one or more laser scanning modules 104 (referred to as "scanners" in FIG. 8). Characteristics of various scanning modules 104 can affect their positioning accuracy and suitability for use in construction sites. Each vendor provides different ways of accessing a scan station (including the scanning module 104), such as wireless connectivity (WLAN), wired connectivity (Ethernet), and manual data transfer through an SD card or USB 2.0 device. Accordingly, such connectivity options from each vendor should be considered and analyzed to select the most compatible laser scanning module for the application's requirements. If the application requires, for example, remote wireless connectivity, built-in connectivity support from a vendor can be problematic.

FIG. 8 shows how various scanning modules can be tested for suitability to a construction site. For example, the capability to calculate the levelness and flatness of a concrete slab can be tested. A wet concrete scan can be performed to test the laser readings in a wet concrete slab and evaluate a laser's reflectivity in the fluid formed by water and concrete and the effects of surface water. In addition, a target 80 measurement test can evaluate a scanning module's reliability in measuring a surface with specified flatness at different distances from the scanning module 104.

After performing these tests, applicable scanning modules can be selected for concrete quality inspection. In FIG. 8, a flowchart shows the steps of setting up laser scanning modules and targets 10, setting parameters 20, scanning 30, importing data from scanners to a file system 40 and data conversion 50.

The scanner system may be any suitable scanner system comprising a laser scanning module and a computing module connectable to and/or integrated in the laser scanning module, the computing module comprising a software for the scanning modules. A 3D laser scan station can be used as the scanner system.

A 3D laser scan station 90 is fully equipped with both software and hardware accessories and comes packaged as a stand-alone unit. The station 90 is provided with interfaces and accessories to access each functionality the device unit provides.

For optimal inspection accuracy, maximum coverage of the concrete slab being inspected may be guaranteed by users during the whole inspection process (including wet and dry phases). Thus, users may devise an inspection strategy according to an analysis of the slab pour break plan to maximize the accuracy of the inspection phase and specifically for each slab pour.

An inspection plan includes a scan plan which is a set of information that outlines the scope and approach that may be taken to capture the data on-site. For example, a scan plan can start with detailed analysis of precisely which elements need to be captured. Depending on the inspection plan scanners can capture the position of each and every element or only specific scopes of work about which more information is needed. Identifying the exact scope of elements to be scanned helps the on-site team to prioritize their efforts and mitigate time spent capturing unnecessary elements. With a clear scope in mind a document can be created that identifies the optimum equipment location necessary to capture the desired information.

Figure 9:
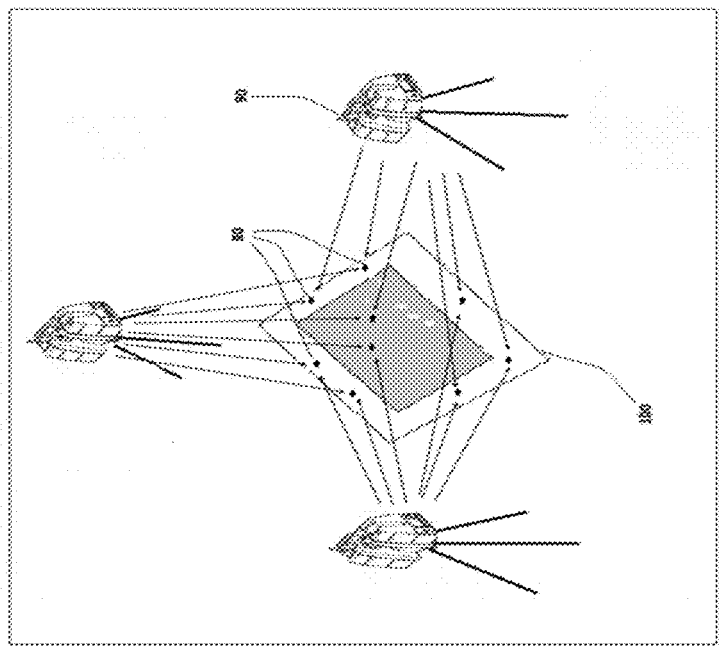
FIG. 9 shows a representation of a plurality of laser scanning stations with targets placed on a target area, in accordance with an embodiment.

Setting up laser scanning modules and targets 10 can be completed after devising the inspection plan. According to the devised inspection plan, users can place two or more 3D laser scan stations 90 in strategic spots in the inspection area as shown in FIG. 9 so the entire inspection area can be accessed and scanned.

During the scanning process a series of targets 80 can be used to assist in the post processing effort. Generally, targets 80 for scanning can be paper-based hatching patterns that are placed onto a flat surface or spherical objects that can be set onto a surface. The intent of targets 80 is to provide a minimum of three common points of reference across scanning locations so that each reference can be joined with its previous scan presence. Increasing the number of common targets 80 can increase the accuracy of the final registered scan.

Preferably, 3D scanning positioning targets 80 should be located on the items 100 under inspection so that laser scanning modules can create a reference points for better alignment and project data. Different kinds of reference systems can be used. Failing to have enough targets 80, in some cases, can greatly hinder the post processing effort and may result in a low quality registration. Further, failing to have enough targets 80 may require additional site visits and cost.

In addition to positioning laser scanning modules or scan station 90 to set the elements to capture, the precise level of detail at which the information should be gathered by the scanning modules can be set or determined. The scanning modules can be adjusted to precise operational settings to regulate the fidelity of the laser beams, which is known as the resolution and quality settings.

Parameters (such as resolution and quality) 20 can be set or determined, and after the scanning process 30, the scanned data is imported from scanning modules into a file system 40. By utilizing parameters 20, this process of data importation 40 can also include the process of eliminating noise, filtering, or registering the data. In some cases, setting of the parameters can be performed through a third-party application or an adaptable software 220 that can control the third-party application 210 and access scan data.

The scanned images are transferred into a common reference system that merges image data into a complete model. This process is called alignment, or registration. By repeating the process 60 of setting up scanning modules and targets 10 and setting up parameters 20, multiple scans of the same inspection area can be referenced to a single reference system with at least three positional targets 80, which may help during the registration phase to build a single-scan model of the inspection area. In other words, multiple scans are captured from different scanning stations and then the data from multiple scanning stations is stitched together in what is commonly known as the post processing or registration stage generating point cloud data. Software, such as for example CAD or BIM, can be used to author object models while referencing a point cloud.

Although a comprehensive amount of scanned data and meta-data are available after the scan, they may be available in a proprietary format that can only be accessed through application software made available by the proprietor. Accordingly, after accessibility to the output scan data is granted by the implementation of the proprietor's software, the points cloud can be converted to a different, openly accessible format through a repetitive data conversion process 70, 50 so the final application can leverage the open-source point cloud data format. These openly accessible data 200 can be used, for example, for the point cloud library (PCL), which is an open-source library of algorithms for point cloud processing tasks and 3D geometry processing. Another example would to use these openly accessible data in a machine learning system for quality inspection of construction sites.

In another embodiment, the present disclosure relates to a data processing system for producing openly accessible data, including an input device, a central processing unit, a memory, and a display, wherein the data processing system has stored data representing sequences of instructions which when executed cause the method as defined above to be performed. In yet another aspect, the present disclosure relates to a computer software containing sequences of instructions which when executed cause the method as defined above to be performed. In some implementations, the present disclosure relates to an integrated circuit containing sequences of instructions which when executed cause the method as defined above to be performed.

Systems and methods described herein may be applicable in various types of inspections in construction sites. As a first example, systems and methods of the present disclosure can be used to identify the flatness and levelness of concrete pours earlier in the process and mitigate more expensive rework when done well after the concrete has dried. Further, the present disclosure can be used to inspect positioning of a reinforcement bar prior to a cement pour. After a base level grain has been applied, the reinforcement bar (rebar) is positioned on holders of cement. This rebar must be level to maximize concrete strength. In variations, the present disclosure can also be applied to inspect the uniformness and levelness of the full area across the grain base.

In an embodiment, the processing of imaging data from a laser scanning operation can be based on computational modules. Computational modules can be implemented using any computational paradigm capable of performing data analysis based on various methods such as regression, classification and others. In some variations, the computational modules can be learning based. One learning based computational paradigm capable of performing such methods may be a neural network. Neural networks may include Restricted Boltzmann Machines, Deep Belief Networks, and Deep Boltzmann Machines. Accordingly, a neural network can be used to process the imaging data acquired during a laser scanning operation, for example to evaluate the condition of the target object or scene being scanned laser scanning module (e.g. for defects, irregularities, etc.). Thus, imaging data representing scans performed by the laser scanning module, as well as relevant data from databases and other services, can be provided to a neural network, which can perform evaluation based on classification/regression or similar methods.

In some variations, the neural network can operate in at least two modes. In a first mode, a training mode, the neural network can be trained (i.e. learn) based on known targets having a known condition/composition containing the known presence or absence of a de. The training typically involves modifications to the weights and biases of the neural network, based on training algorithms (backpropagation) that improve its evaluation capabilities. In a second mode, a normal mode, the neural network can be used to evaluate the target for a particular condition. In variations, some neural networks can operate in training and normal modes simultaneously, thereby both evaluating the target for a particular condition, and training the network based on the evaluation effort performed at the same time to improve its evaluation capabilities. In variations, training data and other data used for performing evaluation services may be obtained from other services such as databases or other storage services. Some computational paradigms used, such as neural networks, involve massively parallel computations. In some implementations, the efficiency of the computational modules implementing such paradigms can be significantly increased by implementing them on computing hardware involving a large number of processors, such as graphical processing units.

Figure 10:
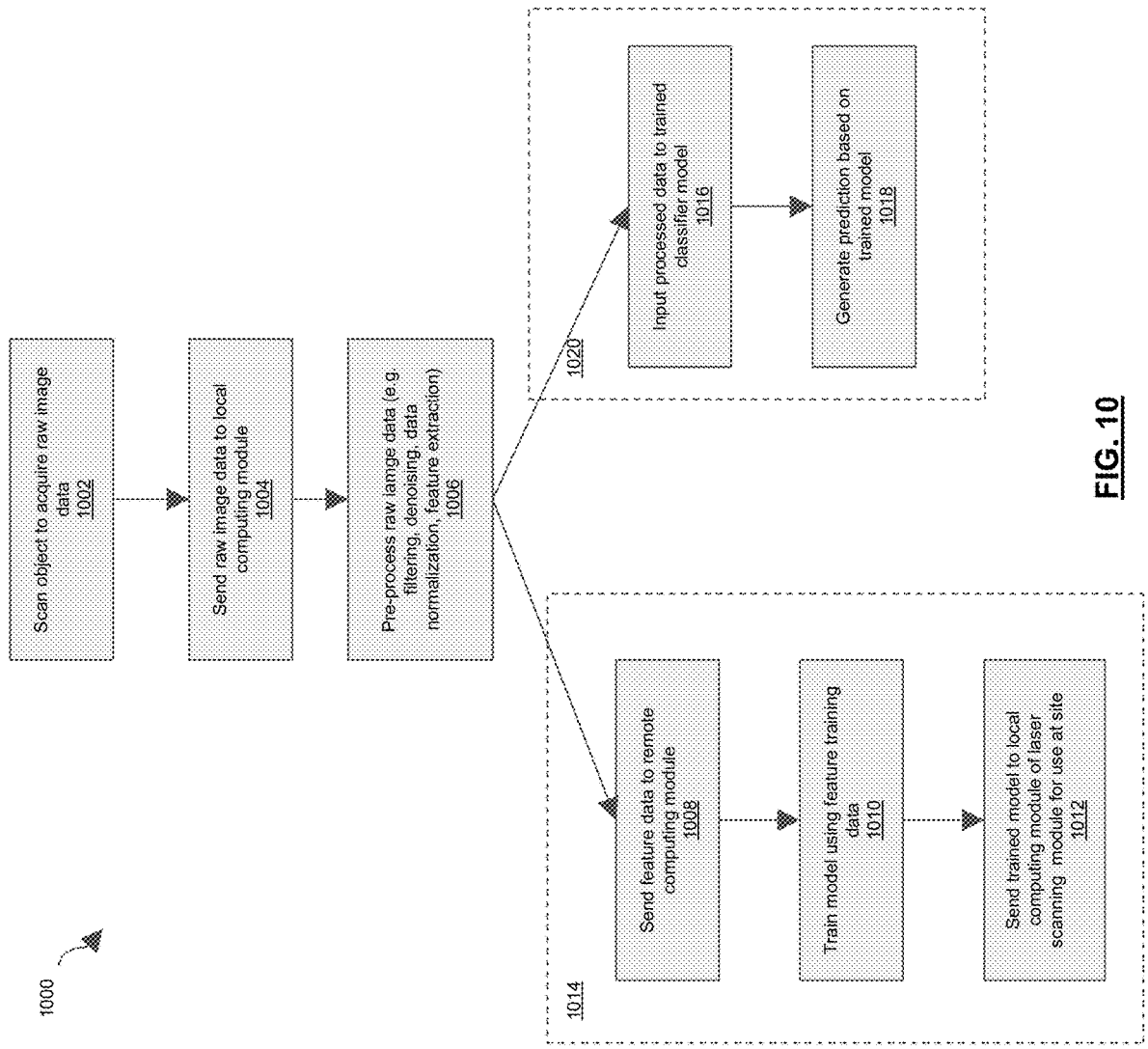
FIG. 10 shows a method for evaluating the condition of a target using a neural network, for use at a laser scanning module of a distributed laser scanning system, in accordance with an embodiment.

Referring now to FIG. 10, in accordance with an embodiment, shown therein is a method 1000 for inspecting and evaluating the condition of a target area using a neural network, for use at a local laser scanning module of a distributed laser scanning inspection system. The method 1000 shows both a training mode 1014 and a normal mode 1020 which, in some embodiments, may operate simultaneously at the local laser scanning module. At 1002, the laser scanning module scans the object, acquiring raw image data. At 1004, the raw data is sent from the laser scanning module to the local computing module. In some cases, the local computing module may be embedded in the laser scanning module. At 1006, the raw image data is pre-processed, which may include the application of filtering, denoising, data normalization, and feature extraction techniques, and the like. By applying feature extraction techniques to the raw data, feature data is generated. Features calculated at the local computing module may use classification and analysis services of the remote computing module. At 1008, the feature data can be sent to a remote computing module, which may be accessible via a private or external network and may reside in the cloud. Optionally, the raw image data may be sent to the remote computing module for pre-processing and computing of feature vectors. Features or raw data may be anonymized, encrypted, compressed, logged for auditing, and associated with a jurisdictional identifier prior to transfer to and from the remote computing module. The remote computing module can include a computational module, such as a neural network, which may, at 1010, be trained using the training data. In some cases, training data may be collected from cloud storage, in addition to or instead of training data collected from the inspection site. Training data may be labelled and used as reference data to train the computational module, such as a classification model, in a supervised learning method. In alternate embodiments, unsupervised or semi-supervised training methods may be used to generate a trained computational module. Once a model is trained, the model may be encrypted, compressed, logged for auditing, anonymized and/or associated with a jurisdictional identifier before transfer to or from the cloud. Once models trained at the remote computing module are ready, they can be deployed by pushing to the inspection site remotely, or pulling from the remote computing module from the site. At 1012, the trained model of the computational module is sent to the local computing module to be used by the laser scanning inspection system at the inspection site (i.e. in normal mode 1020). In some cases, the trained model comprises a classification model for determining the condition of a target area (such as the presence of defects, irregularities, etc.). Once deployed, remote computing module-trained (for example, cloud-trained) models may be pushed back to the remote computing module for reconfiguration, further training or analysis.

Operating in normal mode 1020, raw image data is acquired at block 1002. At 1004, raw image data is sent to the local computing module. At 1006, the raw data is preprocessed, which may include feature extraction. At 1016, the processed image data is used as input for the trained model. At 1018, a prediction is generated by the trained model, which may be output to a user via an output interface of the local computing module.

In some cases, models may be locally trained (i.e. on local computing module) and may be employed on the machines they are trained on, or deployed to other local machines. Locally trained models may also be pushed to the cloud for reconfiguration, further training, or analysis.

In some cases, pre-processing can take place on a laser scanning module that has been enhanced with compute resources e.g. system-on-a-chip ("SoC"), or connected to a field programmable gate array (FPGA) fabric, application specific integrated circuit (ASIC), local servers at the inspection site or cloud servers.

In some embodiments, where a plurality of laser scanning modules are configured according to a master-slave architecture, the trained model may be uploaded from the remote computing module to the local computing module of the master laser scanning module. Imaging data may then be sent from a slave laser scanning module to the master laser scanning module for an evaluation based on the trained model.

Classification should be understood in a larger context than simply to denote supervised learning. By classification process we convey: supervised learning, unsupervised learning, semi-supervised learning, active/groundtruther learning, reinforcement learning and anomaly detection. Classification may be multi-valued and probabilistic in that several class labels may be identified as a decision result; each of these responses may be associated with an accuracy confidence level. Such multi-valued outputs may result from the use of ensembles of same or different types of machine learning algorithms trained on different subsets of training data samples. There are various ways to aggregate the class label outputs from an ensemble of classifiers; majority voting is one method.

Embodiments of the systems and methods of the present disclosure may implement groundtruthing to ensure classification result accuracy according to an active learning technique. Specifically, results from classification models may be rated with a confidence score, and high uncertainty classification results can be pushed to a groundtruther to verify classification accuracy. Optionally, classification outputs can periodically be provided to groundtruthers to ensure accuracy. In some implementations, a determination by the system indicative of a condition of the target may result in generating a request for human groundtruthing of the condition signal or the target from which the signal was generated.

In variations, evaluation of the condition of a target using a neural network or clustering mechanism can be an ongoing process. For example, in some implementations, the computing module can be a local computing module and provide results to a remote computing module. The remote computing module can include appropriate learning mechanisms to update a training model based on the newly received signals. For example, the remote computing module can be a neural network based system implemented using various application programming interfaces APIs and can be a distributed system. The APIs included can be workflow APIs, match engine APIs, and signal parser APIs, allowing the remote computing module to both update the network and determine whether a desired condition is present or absent in the target based on the received signal.

Further embodiments will now be described relating to variations of the above systems and methods implementing machine-learning processing techniques. Machine learning-implemented processing techniques, particularly making use of neural networks, may facilitate: analysis of laser scan imaging data, which may include generating a multi-dimensional image of the target surface; and denoising and calibrating imaging data. These techniques may be carried out by a computing module and/or by a remote computing module.

Analysis of imaging data may be implemented by providing input data to a neural network, such as a feed-forward neural network, for generating at least one output. The neural networks described below may have a plurality of processing nodes, including a multi-variable input layer having a plurality of input nodes, at least one hidden layer of nodes, and an output layer having at least one output node. During operation of a neural network, each of the nodes in the hidden layer applies a function and a weight to any input arriving at that node (from the input layer of from another layer of the hidden layer), and the node may provide an output to other nodes (of the hidden layer of to the output layer). The neural network may be configured to perform a regression analysis providing a continuous output, or a classification analysis to classify data. The neural networks may be trained using supervised or unsupervised (or semi-supervised) learning techniques, as described above. According to a supervised learning technique, a training dataset is provided at the input layer in conjunction with a set of known output values at the output layer. During a training stage, the neural network may process the training dataset. It is intended that the neural network learn how to provide an output for new input data by generalizing the information it learns in the training stage from the training data. Training may be effected by backpropagating error to determine weights of the nodes of the hidden layers to minimize the error. The training dataset, and the other data described herein, can be stored in a database connected to the laser scanning module 104, or otherwise accessible to laser scanning module 104 or computing module. Once trained, or optionally during training, test data can be provided to the neural network to provide an output. A neural network may thus cross-correlate inputs provided to the input layer in order to provide at least one output at the output layer. Preferably, the output provided by a neural network in each embodiment will be close to a desired output for a given input, such that the neural network satisfactorily processes the input data.

According to a further embodiment, machine learning techniques may be applied in order to improve denoising of imaging data. Particularly, a neural network may be trained to denoise imaging data for a given pattern of noise, saturation, such as vibration, acceleration, direction etc. Particularly, a motion vector and imaging data may be provided to a neural network at its input layer, with a desired output compensating for defects in the imaging data that may be caused by the motion of the target object (and surface) for the motion vector. The neural network may be trained such that the output layer provides clean imaging data compensating for motion and saturation defects. The neural network may be trained with a training dataset comprising, at the input layer, imaging data comprising motion and saturation defects and associated motion vectors, and with associated clean imaging data at the output layer, free of motion and saturation defects. Accordingly, such a trained neural network learns a pattern of defects exhibited in the presence of a given motion vector, in order to generate clean imaging data as the output, free of motion and saturation defects.

Figure 11:
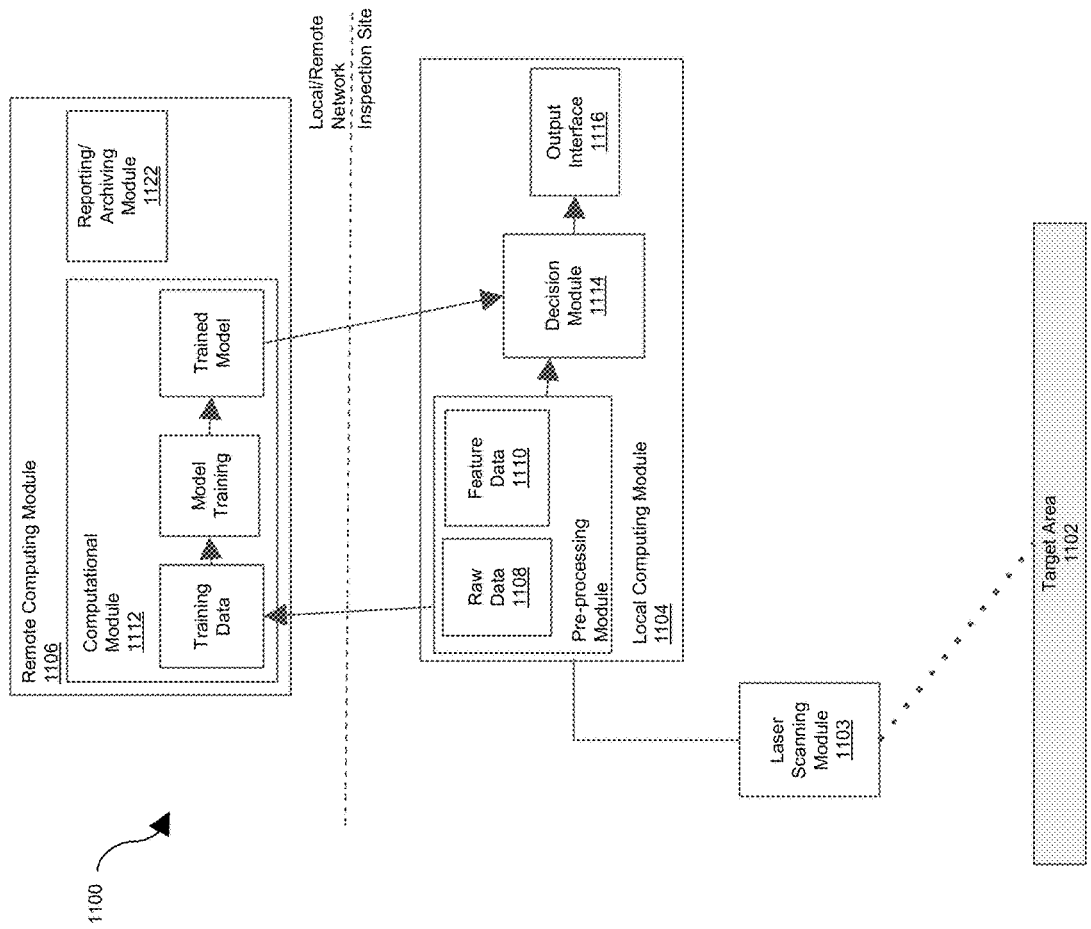
FIG. 11 shows a block diagram of an integrated laser scanning and signal processing system, operating in training and normal modes, in accordance with an embodiment.

Referring now to FIG. 11, shown therein is a laser scanning inspection system 1100, operating in training and normal modes simultaneously, in accordance with an embodiment. The system 1100 comprises a distributed system including a laser scanning module 1103 for scanning a target area 1102 and acquiring imaging data therefrom and a local computing module 1104, each located at an inspection site, and a remote computing module 1106 communicatively linked to the system 1100 via a network. In some cases, remote computing module 1106 resides in the cloud. The target area 1102 is scanned, and the acquired data analyzed, to monitor its condition. The laser scanning module 1103 scans the target area 1102 with a light beam. Raw laser scan data corresponding to a plurality of distance measurements is acquired and can be processed by the computing module. Processing may include feature extraction techniques. Though shown as occurring at local computing module 1104, processing of raw data may occur at the local computing module 1104, the remote computing module 1106, or both. Raw data 1108 or processed feature data 1110 can be sent from local computing module 1104 to remote computing module 1106, where it can be used as training data in training a computational module 1112 (e.g. neural network). Training via the computational module 1112 can produce a trained model, which can then be sent to a decision module 1114 of the local computing module 1104 for use at the inspection site in an asset monitoring operation. The decision module may be configured to generate a determination as to the presence of defects or irregularities in the target based on the imaging data. In a further aspect of the system 1100, the pre-processed data can be sent to the decision module 1114 for classification by the trained classification model. The output of the decision module 1114 can be provided to a user via an output interface 1116. After the processed data has been applied to the trained model at the decision module 1114, the determination can also be locally stored on local computing module 1104. Locally stored data may be sent from the local computing module 1104 to the remote computing module 1106 for reporting/archiving 1122.

The present disclosure teaches a system and method for evaluating the condition of target, the target comprising an object, material, area, etc. using an integrated laser scanning and signal processing operation. The condition may be evaluated through using a laser scanning module to generate imaging data according to a laser scanning modality such as phase shift measurement, and applying signal processing (e.g. machine learning) techniques to the imaging data. The imaging data may comprise a set of data points, which can be aggregated to create a 3D representation of the target for evaluation. By applying machine learning techniques to imaging data generated by the laser scanning module, target imaging and evaluation processes that may be useful in areas such as quality control applications can be increasingly automated, thereby reducing the requirement for human intervention and ultimately improving efficiency and accuracy.

The above described embodiments of the present disclosure are intended to be examples of the present disclosure and alterations and modifications may be effected thereto, by those of skill in the art, without departing from the scope of the present disclosure, which is defined solely by the claims appended hereto. For example, systems, methods, and embodiments discussed can be varied and combined, in full or in part.

Thus, specific systems and methods for evaluating the condition of a target using a laser scanning imaging modality and signal processing techniques have been disclosed. It should be apparent, however, to those skilled in the art that many more modifications besides those already described are possible without departing from the inventive concepts herein. The subject matter of the present disclosure, therefore, is not to be restricted except in the spirit of the disclosure. Moreover, in interpreting the present disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A laser scanning inspection system for scanning one or more surfaces, the system comprising:
   at least one laser scanning module for acquiring imaging data comprising one or more distance measurements between the laser scanning module and each of the surfaces, according to a laser scanning modality, the laser scanning modality is a phase shift measurement modality; and a computing module, comprising one or more processors, in communication with the laser scanning module, for:
aggregating the imaging data;
processing and denoising the imaging data; and
determining the presence or absence of a condition on each of the surfaces based on the imaging data.

2. The system of claim 1, wherein the laser scanning module comprises:
a light source for emitting a laser beam;
a target photodetector for generating imaging data from the laser beam;
a beam steering device to direct the laser beam at a series of points on a respective one of the surfaces and to direct the laser beam reflected off the respective surface to the photodetector; and
a distance module for determining the distance measurements associated with the imaging data corresponding to phase shift measurements for the series of points.

3. The system of claim 2, wherein the laser scanning module further comprises a reference photodetector and a beam splitter, the beam splitter directing a first portion of the laser beam towards the respective surface and directs a second portion of the laser beam towards the reference photodetector, the second portion used by the distance module as a reference for the phase shift measurement.

4. The system of claim 2, wherein the light source modulates the emitted laser beam, and wherein the distance module applies heterodyne demodulation to determine the phase shift.

5. The system of claim 1, wherein the laser scanning module acquires reference imaging data associated with a reference surface, and the computing module uses the reference imaging data as a reference for determining relative positioning of the one or more surfaces.

6. The system of claim 1, wherein the imaging data comprises a three dimensional point cloud in a coordinate system, and wherein the aggregating and processing of the imaging data generates a three-dimensional model of the surface.

7. The system of claim 1, wherein the at least one laser scanning module comprises a plurality of laser scanning modules spaced from each other, and wherein the computing module aggregates the imaging data from the plurality of laser scanning modules.

8. The system of claim 1, wherein the computing module employs a neural network for receiving the imaging data at an input layer and generating the determination of the presence or absence of the condition on each of the surfaces at an output layer.

9. The system of claim 8, wherein the neural network employed by the computing module comprises at least one of supervised learning, unsupervised learning, semi-supervised learning, groundtruther learning, reinforcement learning, or anomaly detection.

10. The system of claim 8, wherein the neural network employed by the computing module comprises a trained model that is trained on a computing device that is remote from the computing module.

11. A method for laser scanning inspection of one or more surfaces, the method comprising:
acquiring imaging data comprising one or more distance measurements according to a laser scanning modality, the laser scanning modality is a phase shift measurement modality;
aggregating the imaging data;
processing and denoising the imaging data; and
determining the presence or absence of a condition on each of the surfaces based on the imaging data.

12. The method of claim 11, further comprising:
emitting a laser beam;
directing the laser beam at a series of points on a respective one of the surfaces;
directing the laser beam reflected off the respective surface to a photodetector;
generating imaging data from the reflected laser beam; and
determining the distance measurements associated with the imaging data corresponding to phase shift measurements for the series of points.

13. The method of claim 12, further comprising:
directing a first portion of the laser beam towards the respective surface; and
directing a second portion of the laser beam towards a reference photodetector, wherein the second portion is used as a reference for the phase shift measurement.

14. The method of claim 12, further comprising:
modulating the emitted laser beam prior to emission; and
applying heterodyne demodulation to determine the phase shift.

15. The method of claim 11, wherein determining the presence or absence of a condition on each of the surfaces based on the imaging data uses a neural network, the imaging data received at an input layer of the neural network and the determination of the presence or absence of the condition on each of the surfaces is generated at an output layer.

16. The method of claim 15, further comprising:
sending the imaging data to a remote computing device, the sent imaging data used by the remote computing device as training data to train a machine learning model;
receiving the trained machine learning model from the remote computing device; and
performing the determining of the presence or absence of a condition on each of the surfaces using the trained machine learning model.

17. The method of claim 15, further comprising:
sending the imaging data to a remote computing device, the remote computing device applying the imaging data to a trained machine learning model to determine the presence or absence of a condition on each of the surfaces; and
receiving the determination of the presence or absence of a condition on each of the surfaces from the remote computing device.

18. A method for inspection of concrete using laser scanning, the method comprising:
positioning one or more targets on the concrete;
acquiring imaging data from a plurality of laser scanning modules, the imaging data comprising a distance measurement from the respective laser scanning module to each of the targets, according to a laser scanning modality;
registering the imaging data by stitching the imaging data from each of the laser scanning modules together for each of the targets;
processing and denoising the registered imaging data; and
determining a property of the concrete at each of the targets based on the respective registered imaging data.

* * * * *